US011908640B2

(12) United States Patent
Yasunaga et al.

(10) Patent No.: US 11,908,640 B2
(45) Date of Patent: Feb. 20, 2024

(54) PUSH SWITCH

(71) Applicant: MITSUMI ELECTRIC CO., LTD., Tokyo (JP)

(72) Inventors: Yoichi Yasunaga, Tokyo (JP); Takashi Kawamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/812,908

(22) Filed: Jul. 15, 2022

(65) Prior Publication Data

US 2023/0013822 A1 Jan. 19, 2023

(30) Foreign Application Priority Data

Jul. 16, 2021 (JP) ................................ 2021-118021
Jul. 16, 2021 (JP) ................................ 2021-118022

(51) Int. Cl.

*H01H 13/06* (2006.01)
*H01H 13/14* (2006.01)
*H01H 13/10* (2006.01)
*H01H 13/20* (2006.01)

(52) U.S. Cl.

CPC ............ *H01H 13/06* (2013.01); *H01H 13/10* (2013.01); *H01H 13/14* (2013.01); *H01H 13/20* (2013.01); *H01H 2233/07* (2013.01)

(58) Field of Classification Search

CPC ........ H01H 13/06; H01H 13/10; H01H 13/14; H01H 13/20; H01H 2233/07; H01H 13/86; H01H 2205/016; H01H 2223/002; H01H 2231/022; H01H 13/04; H01H 13/22; H01H 13/26; H01H 13/48; H01H 13/50; H01H 13/506; H01H 13/52; H01H 3/12; H01H 5/30; H01H 9/04; H01H 2215/004; H01H 2227/002

See application file for complete search history.

(56) References Cited

U.S. PATENT DOCUMENTS 4,987,278 A * 1/1991 Tsutsumi ............... H01H 13/06 200/406
11,495,418 B2 * 11/2022 Mora ..................... H01H 13/48

FOREIGN PATENT DOCUMENTS

JP 2011113652 A 6/2011

* cited by examiner

*Primary Examiner* — Lheiren Mae A Caroc
(74) *Attorney, Agent, or Firm* — McCoy Russell LLP

(57) ABSTRACT

A push switch contains a case including a containing portion and a sealing groove; a pair of contacts disposed in the containing portion so as to be spaced apart from each other; a movable contact which is disposed above the pair of contacts in the containing portion; a cap including a base portion disposed on the case and a sealing protrusion protruding from a peripheral edge portion of the base portion toward a lower side for liquid-tightly sealing the sealing groove of the case; and a cover attached to the case from an upper side so as to hold the cap on the case. The sealing protrusion of the cap is compressively deformed in the sealing groove of the case, and thereby the sealing groove of the case is liquid-tightly sealed.

13 Claims, 16 Drawing Sheets

PUSH SWITCH

CROSS-REFERENCE TO RELATED APPLICATIONS

The present application claims priority to Japanese Patent Application No. 2021-118021, filed Jul. 16, 2021, and to Japanese Patent Application No. 2021-118022, filed Jul. 16, 2021. The entire contents of the above-listed applications are hereby incorporated by reference for all purposes.

TECHNICAL FIELD

The present disclosure generally relates to push switches, in particular to a push switch which operates with a click feeling by a pressing operation.

BACKGROUND

As an operation button of various electronic devices, a push switch utilizing a dome-shaped movable contact has been often employed. Such a push switch is capable of downsizing and reducing a height thereof. Further, when the operation button is operated by a pressing operation from a user, the push switch can provide a good click feeling (pushing operation feeling) to the user.

For example, patent document 1 discloses a push switch 500 as shown in FIGS. 1 and 2. FIG. 1 is an exploded perspective view of the push switch 500. FIG. 2 is a perspective view of the push switch 500. As shown in FIGS. 1 and 2, the push switch 500 contains a case 510 including a substantially square bottom plate 511, four wall portions 512 extending from each side of the bottom plate 511 toward the upper side, a containing portion 513 defined by the bottom plate 511 and the four wall portions 512, and engagement protrusions 514 respectively formed on a pair of opposite wall portions 512 (a pair of wall portions 512 extending in the Y direction in the drawing); a center contact 520 and outer contacts 530 provided on the bottom plate 511 so as to be spaced apart from each other; a dome-shaped movable contact 540 provided in the containing portion 513 so as to be located above the center contact 520 and the outer contacts 530; a cap 550 for covering the containing portion 513 from the upper side, which is formed of elastic material and includes a flat plate-like base portion 551 disposed on upper end surfaces of the four wall portions 512, a protruding portion 552 formed on a substantially center portion of the base portion 551 for pressing the dome-shaped movable contact 540 toward the lower side; and a metal cover 560 for holding the cap 550 on the case 510 by downwardly pressing the base portion 551 from the upper side.

The cover 560 includes a top plate 561 having a substantially square planar shape, a circular opening 562 formed in a substantially center portion of the top plate 561, and a pair of extending portions 563 respectively extending from a pair of opposite sides (a pair of sides extending in the Y direction in the drawing) of the top plate 561 toward the lower side. Further, each of the extending portions 563 has a pair of leg portions 5631 extending from the side of the top plate 561 toward the lower side and a bridging portion 5632 connecting lower end portions of the leg portions 5631 to each other. Further, the bridging portion 5632 is inclined from the lower end portions of the leg portions 5631 toward the outside. Furthermore, each of the engagement protrusions 514 of the case 510 has a slope 5141 whose height gradually increases from the upper side toward the lower side and a flat portion 5142 linearly extending from a top of the slope 5141 toward the lower side.

The dome-shaped movable contact 540 is disposed in the containing portion 513 of the case 510. After that, the base portion 551 of the cap 550 is disposed on the upper end surfaces of the wall portions 512 of the case 510 and then the cover 560 is pressed against the case 510 from the upper side (+Z direction) to attach the cover 560 to the case 510. With this operation, the push switch 500 is assembled. When the cover 560 is attached to the case 510 from the upper side, the bridging portions 5632 of the pair of extending portions 563 of the cover 560 respectively slide on the slopes 5141 of the engagement protrusions 514 of the case 510. As a result, the extending portions 563 are opened toward the outside, and thereby the cover 560 can be pushed toward the lower side (the —Z direction). Thereafter, when the bridging portions 5632 respectively pass through the flat portions 5142 of the engagement protrusions 514, lower end surfaces of the flat portions 5142 are respectively engaged with upper end surfaces of the bridging portions 5632, and thereby the cover 560 is locked with respect to the case 510. As a result, the push switch 500 is assembled.

In a state that the push switch 500 is assembled, the protruding portion 552 of the cap 550 passes through the opening 562 of the cover 560 and protrudes from the top plate 561 of the cover 560 toward the upper side as shown in FIG. 2. Further, the cover 560 is locked with respect to the case 510 and the base portion 551 of the cap 550 is compressed and held between the upper end surfaces of the wall portions 512 of the case 510 and the top plate 561. Thus, the base portion 551 of the cap 550 can liquid-tightly seal a space between the case 510 and the cover 560, and thereby it is possible to prevent water from entering into the containing portion 513 of the case 510. With this configuration, the push switch 500 can realize waterproofness thereof.

The above-described push switch 500 has been often used in various hand-held electronic devices such as a smartphone and a controller of a game machine because the push switch 500 has the waterproofness. However, when strong impact is applied to the electronic device (for example, when a user drops the electronic device to the ground), the strong impact may cause a positional shift, inclination or deformation of the cap 550 held between the case 510 and the cover 560 of the push switch 500 and a gap may occur between the base portion 551 of the case 510 and the cap 550. Further, in a case where a high load or high pressure is applied to the push switch 500, the high load or the high pressure may also cause the positional shift, the inclination or the deformation of the cap 550 held between the case 510 and the cover 560 and the gap may also occur between the base portion 551 and the case 510.

In these cases, there is a possibility that water enters into the containing portion 513 of the case 510 through the gap formed between the case 510 and the base portion 551 of the cap 550. The water entering into the containing portion 513 causes corrosion of the center contact 520 and the outer contacts 530. This deteriorates the function of the push switch 500. Thus, there have been strong needs of keeping the waterproofness of the push switch utilizing the dome-shaped movable contact even if the impact, the high load or the high pressure is applied to the push switch.

Further, when the strong impact is applied to the electronic device (for example, when the user drops the electronic device to the ground), the strong impact may cause deformation such as distortion or warpage of the case 510 of the push switch 500. Thus, there is a problem that the characteristics of the push switch 500 may be changed by the deformation. Further, in the case where the high load or the high pressure is applied to the push switch 500, the high load or the high pressure may also cause the deformation of the case 510 and the characteristics of the push switch 500 may be changed by the deformation. Further, the impact, the load or the pressure may make the cover 560 swing on the case 510 and engagement of the cover 560 with respect to the case 510 is loosened. Thus, there is a problem that the gap is formed between the case 510 and the cover 560 and the gap deteriorates the waterproofness of the push switch 500. Therefore, there have been other strong needs of improving impact resistance, load resistance and pressure resistance of the waterproof push switch utilizing the dome-shaped movable contact.

RELATED ART DOCUMENT

Patent Document

Patent Document 1: JP 2011-113652A

SUMMARY

Problems to be Solved by the Disclosure

The present disclosure has been made in view of the problems of the conventional art mentioned above. Accordingly, it is a first object of the present disclosure to provide a push switch utilizing a dome-shaped movable contact, which can keep waterproofness thereof even if impact, a high load or high pressure is applied to the push switch. Further, it is a second object of the present disclosure to improve impact resistance, load resistance and pressure resistance of the push switch utilizing the dome-shaped movable contact and having the waterproofness.

Means for Solving the Problems

The first object of the present disclosure is achieved by the present disclosure defined in the following (1).

A push switch, comprising:

a case including a containing portion defined by a bottom plate and a plurality of wall portions extending from the bottom plate toward an upper side, and a sealing groove formed on upper end surfaces of the plurality of wall portions;

a pair of contacts provided on the bottom plate of the containing portion so as to be spaced apart from each other;

a movable contact which is disposed above the pair of contacts in the containing portion and can be displaced between a first position in which the pair of contacts are in a non-conductive state and a second position in which the pair of contacts are in a conductive state;

a cap for covering the containing portion of the case from the upper side, the cap including a flat plate-like base portion disposed on the upper end surfaces of the plurality of wall portions of the case, a protruding portion protruding from the base portion toward the upper side, and a sealing protrusion protruding from a peripheral edge portion of the base portion toward a lower side for liquid-tightly sealing the sealing groove of the case; and a cover attached to the case from the upper side so as to hold the cap on the case, the cover including a top plate and an opening which is formed in the top plate and through which the protruding portion of the cap passes, wherein the sealing protrusion of the cap is compressively deformed in the sealing groove of the case in a state that the cap is held on the case by the cover, and thereby the sealing groove of the case is liquid-tightly sealed.

The second object of the present disclosure is achieved by the present disclosure defined in the following (2).

(2) A push switch, comprising:

a case including a containing portion defined by a bottom plate and a plurality of wall portions extending from the bottom plate toward an upper side;

a pair of contacts provided on the bottom plate of the containing portion so as to be spaced apart from each other;

a movable contact which is disposed above the pair of contacts in the containing portion and can be displaced between a first position in which the pair of contacts are in a non-conductive state and a second position in which the pair of contacts are in a conductive state;

a cap for covering the containing portion of the case from the upper side, the cap including a flat plate-like base portion disposed on the upper end surfaces of the plurality of wall portions of the case and a protruding portion protruding from the base portion toward the upper side;

a cover attached to the case from the upper side so as to hold the cap on the case, the cover including a top plate and an opening which is formed in the top plate and through which the protruding portion of the cap passes; and a frame attached to the case from a lower side, the frame including a bottom plate, wherein the case is held between the cover and the frame.

Effect of the Disclosure

In the push switch of the present disclosure, the sealing protrusion extending from the peripheral edge portion of the base portion of the cap toward the lower side is compressively deformed in the sealing groove of the case, and thereby the sealing groove of the case is liquid-tightly sealed. Therefore, the gap is not formed between the cap and the case even if the strong impact, the high load or the high pressure is applied to the push switch. As a result, it is possible to keep the waterproofness of the push switch.

Further, in the push switch of the present disclosure, the sealing protrusion of the cap formed of elastic material is compressively deformed in the sealing groove of the case to realize the waterproofness of the push switch. Therefore, any additional parts are not required for realizing the waterproofness, and thereby it is possible to reduce the number of parts of the push switch.

Further, in the push switch of the present disclosure, the case holding the pair of contacts is held between the cover and the frame. Thus, an upper portion of the case is reinforced by the cover and a lower portion of the case is reinforced by the frame. Therefore, it is possible to suppress the deformation of the case when the impact, the high load or the high pressure is applied to the push switch of the present disclosure, thereby improving the impact resistance, the load resistance and the pressure resistance of the push switch.

Furthermore, in the push switch of the present disclosure, welding pieces of the cover are respectively welded to welding pieces of the frame. Therefore, it is possible to suppress the loosening of the engagement of the case with respect to the cover when the impact, the high load or the high pressure is applied to the push switch of the present disclosure, thereby improving the impact resistance, the load resistance and the pressure resistance of the push switch.

Further, in the push switch of the present disclosure, the case is sandwiched between the cover and the frame from upper side and the lower side, and the cover and the frame are welded to each other to firmly fix them with each other, thereby preventing the case from being deformed. Therefore, the push switch of the present disclosure has excellent impact resistance, excellent load resistance and excellent pressure resistance.

DETAILED DESCRIPTION

Figure 1:
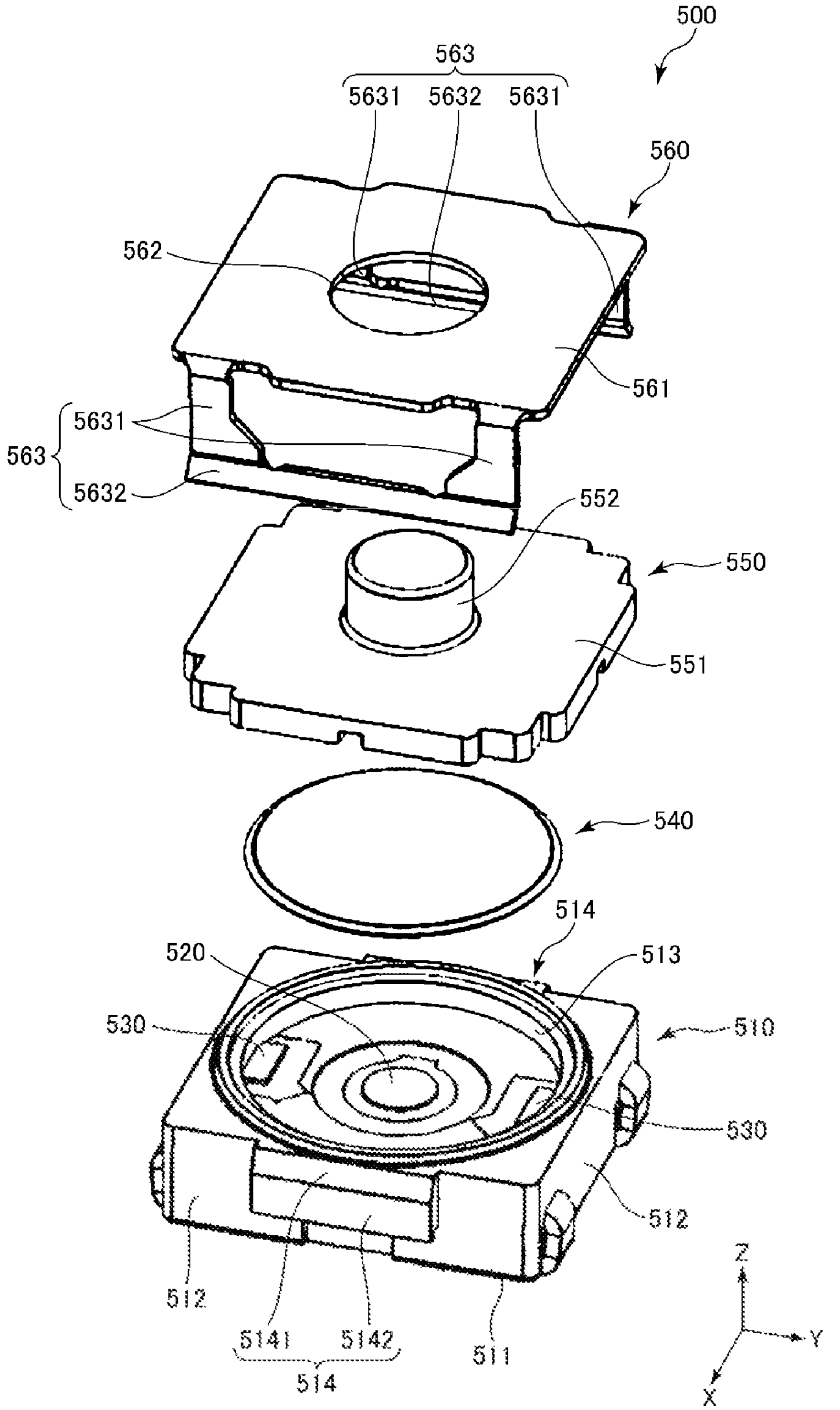
Prior art Fig. 1
FIG. 1 is an exploded perspective view of a conventional push switch.

Hereinafter, description will be given to a push switch of the present disclosure based on a preferred embodiment shown in the accompanying drawings. In this regard, the drawings referenced in the following description are schematic views prepared for explaining the present disclosure. A dimension (such as a length, a width and a thickness) of each component shown in the drawings is not necessarily identical to an actual dimension. Further, the same reference numbers are used throughout the drawings to refer to the same or like elements. In the following description, the positive direction of the Z-axis in each figure is sometimes referred to as "an upper side" and the negative direction of the Z-axis is sometimes referred to as "a lower side".

Figure 3:
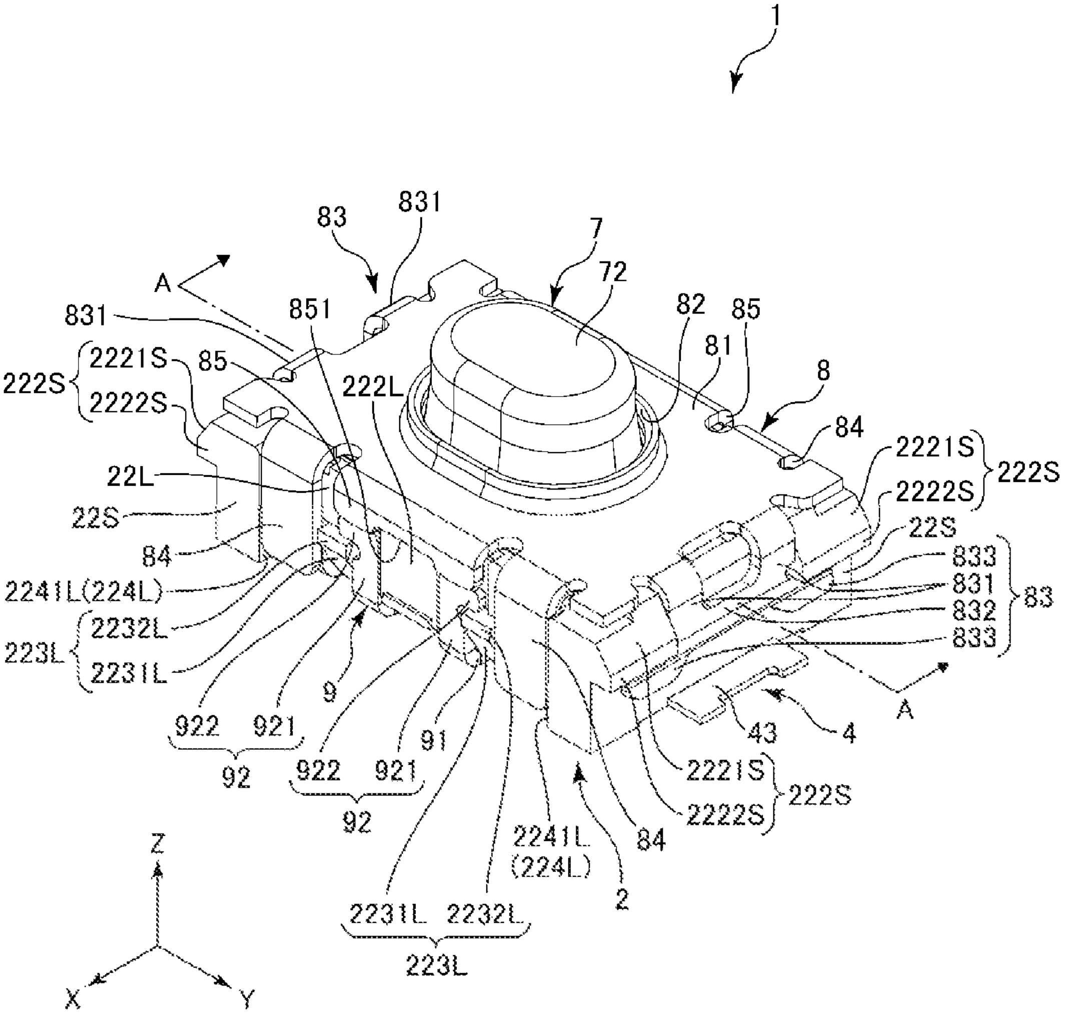
FIG. 3 is a perspective view of a push switch according to the present disclosure.
Figure 4:
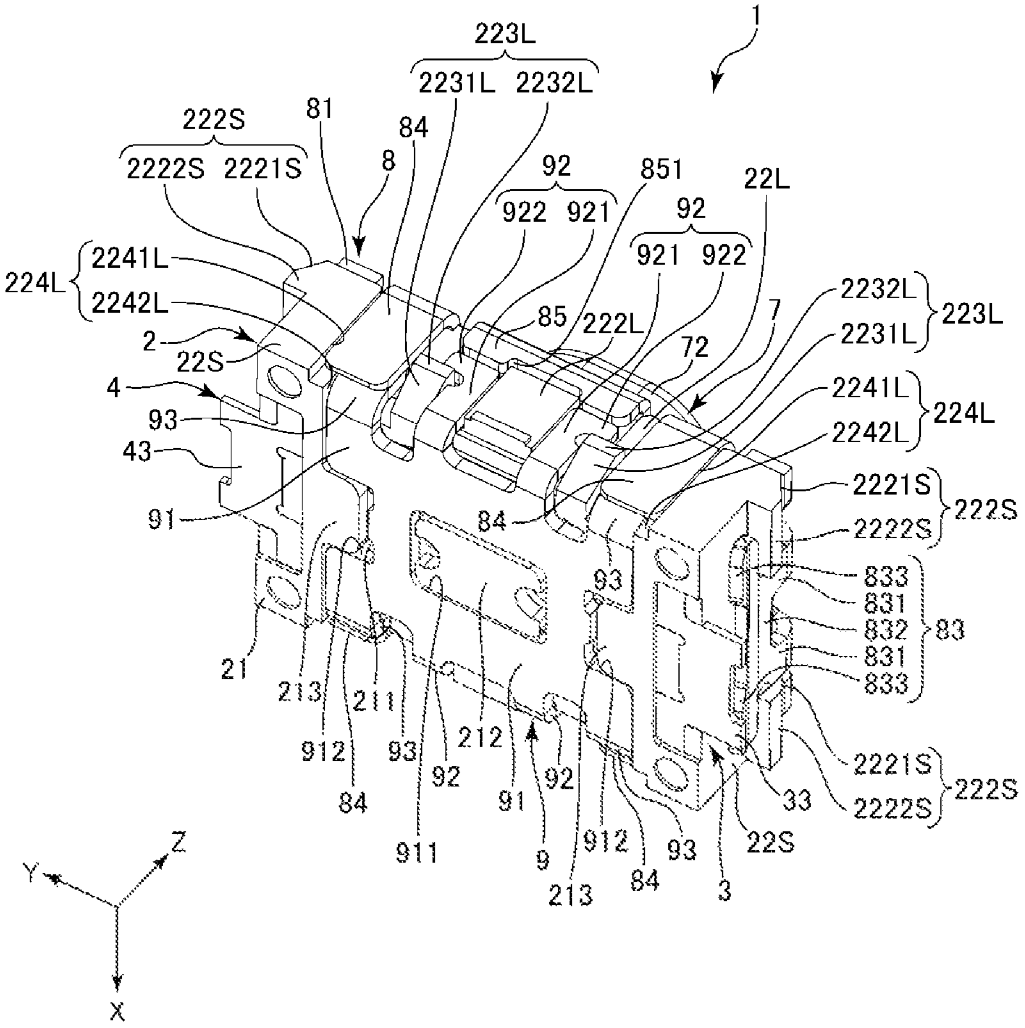
FIG. 4 is a perspective view of the push switch shown in FIG. 3 viewed from another angle.
Figure 5:
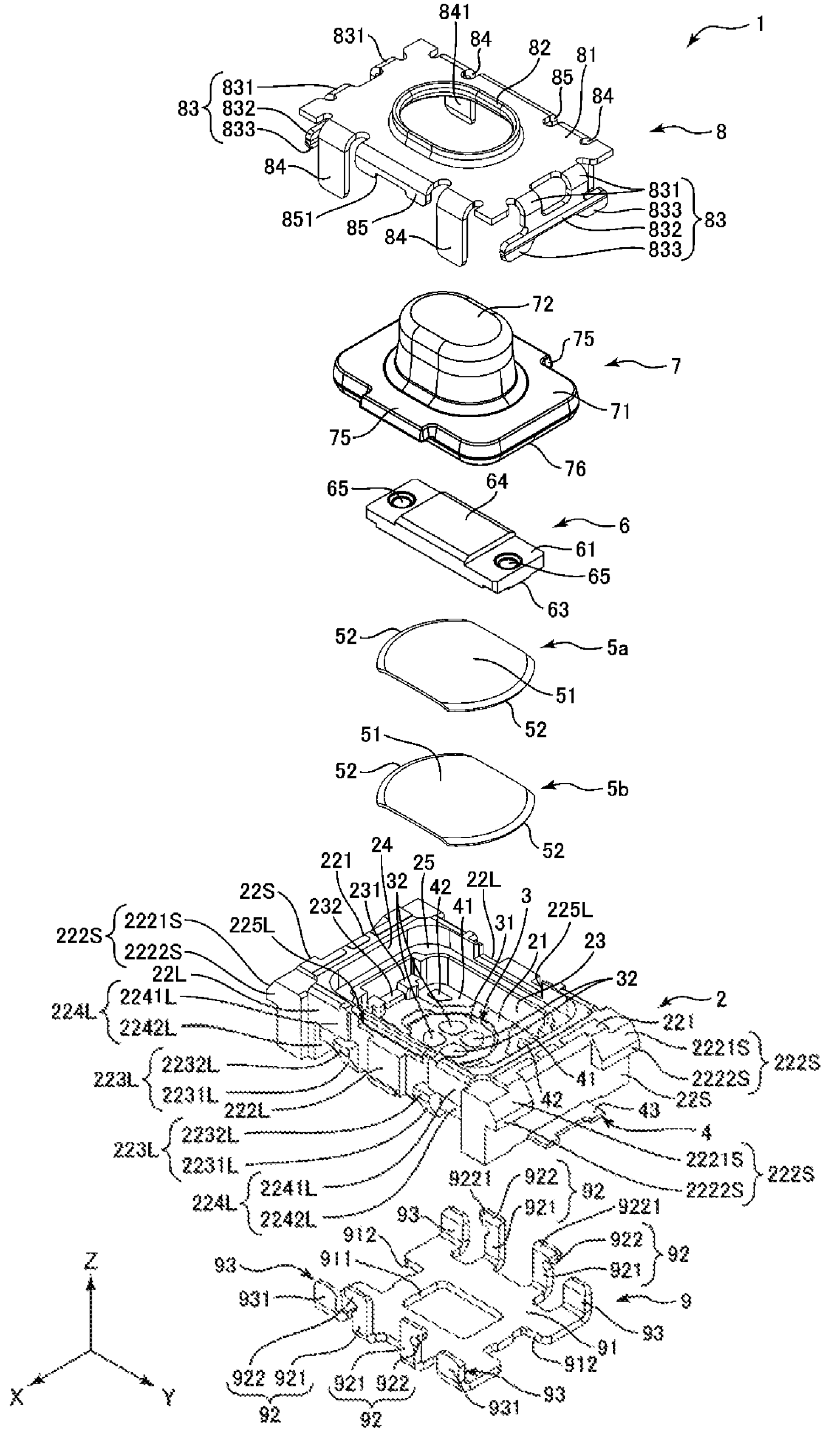
FIG. 5 is an exploded perspective view of the push switch shown in FIG. 3.
Figure 6:
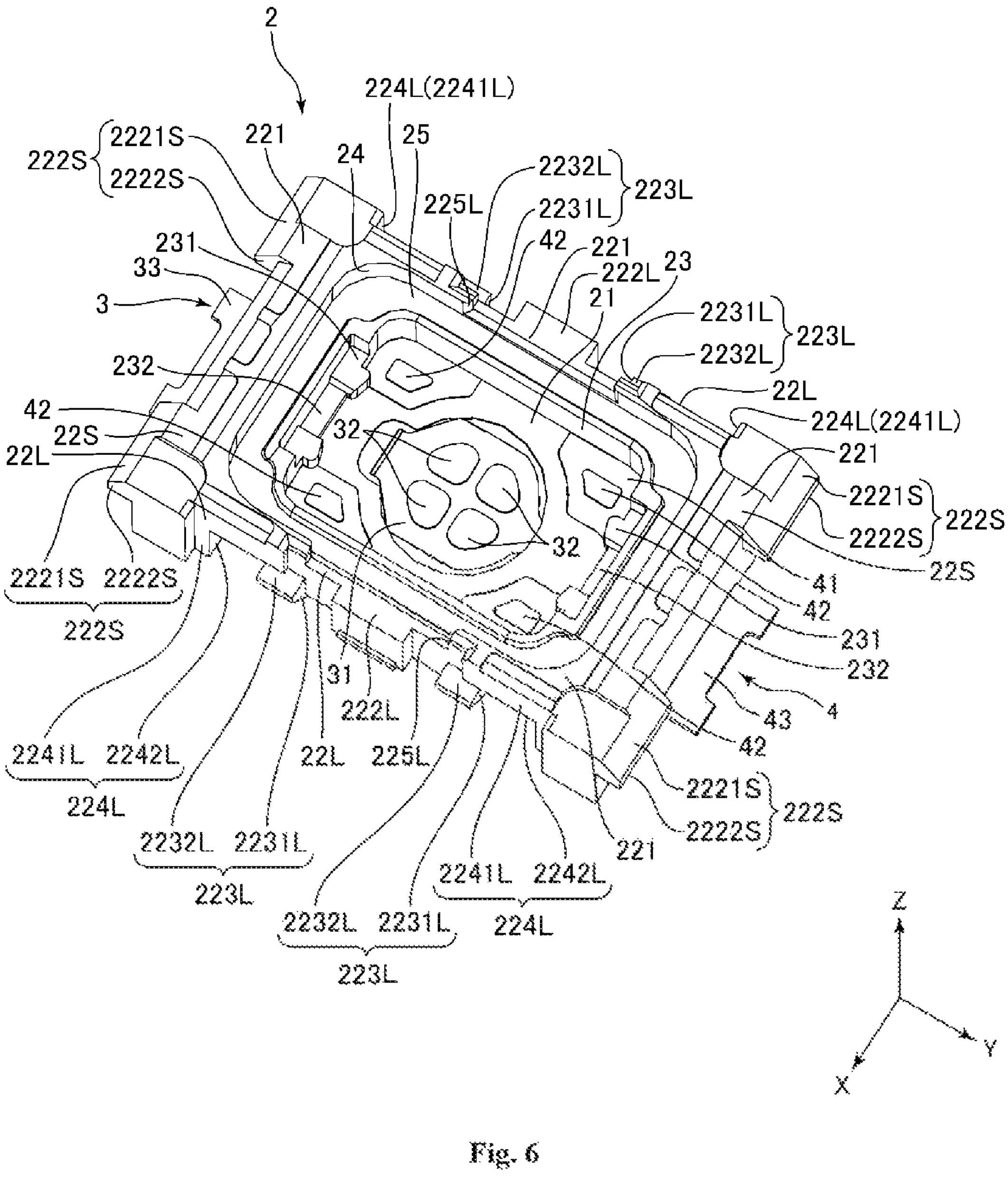
FIG. 6 is a perspective view of a case, a center contact and an outer contact of the push switch shown in FIG. 5 viewed from another angle.
Figure 7:
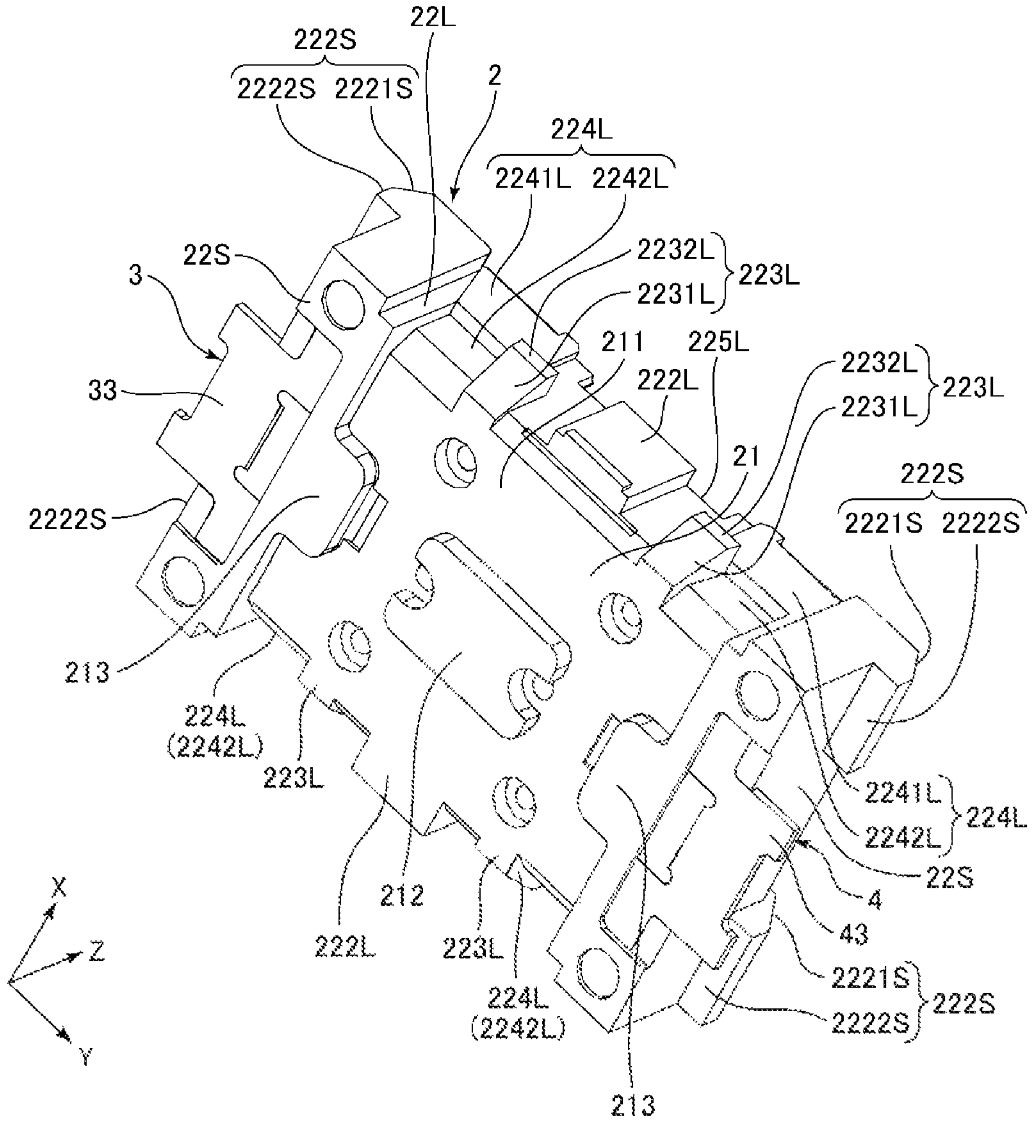
FIG. 7 is a perspective view of the case, the center contact and the outer contact of the push switch shown in FIG. 5 viewed from yet another angle.
Figure 8:
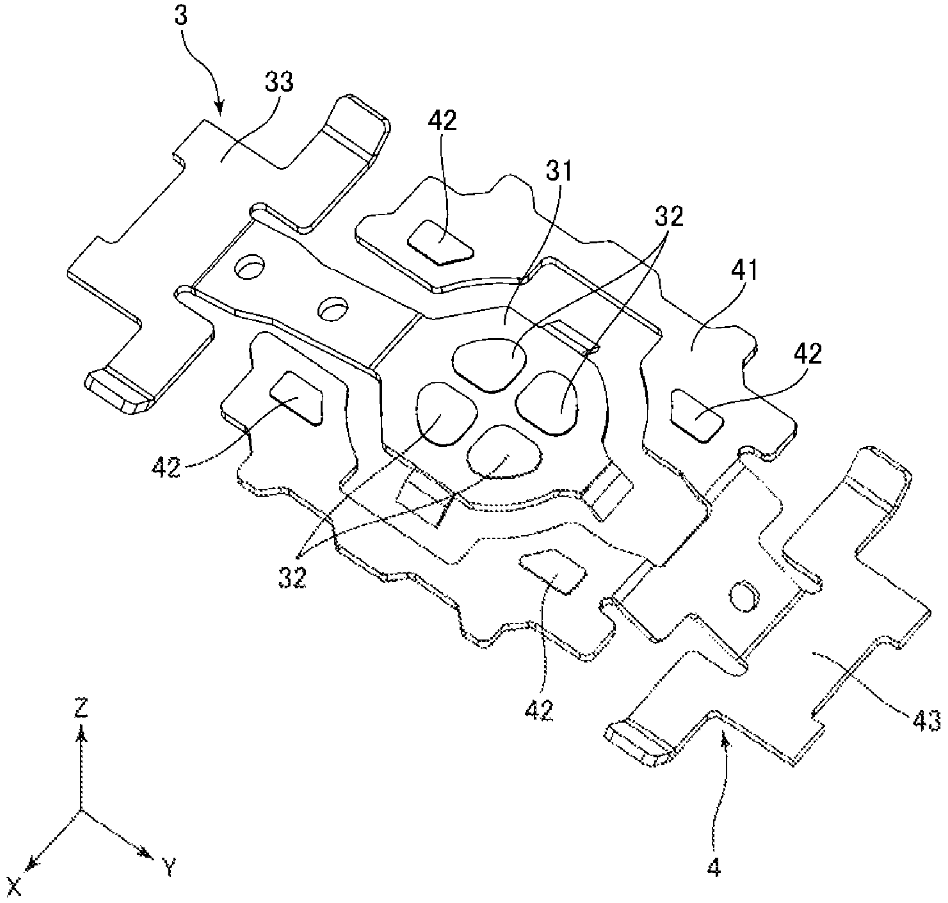
FIG. 8 is a perspective view of the center contact and the outer contact shown in FIGS. 6 and 7.
Figure 9:
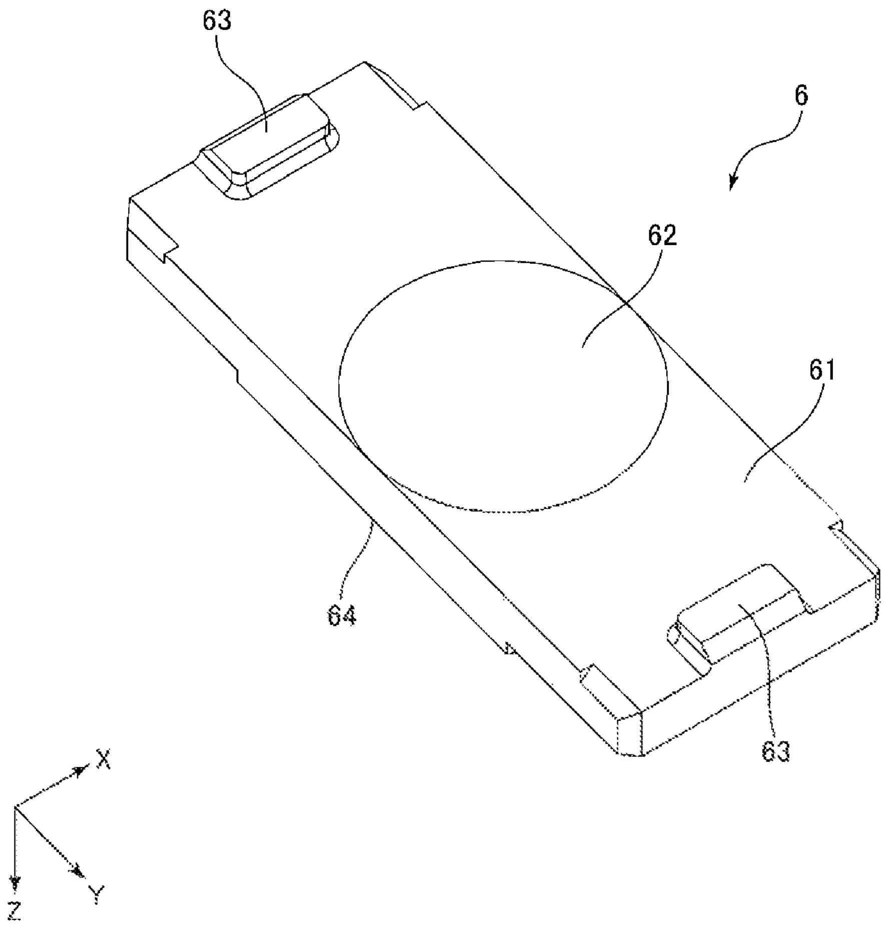
FIG. 9 is a perspective view of a pressing member shown in FIG. 5 viewed from another angle.
Figure 10:
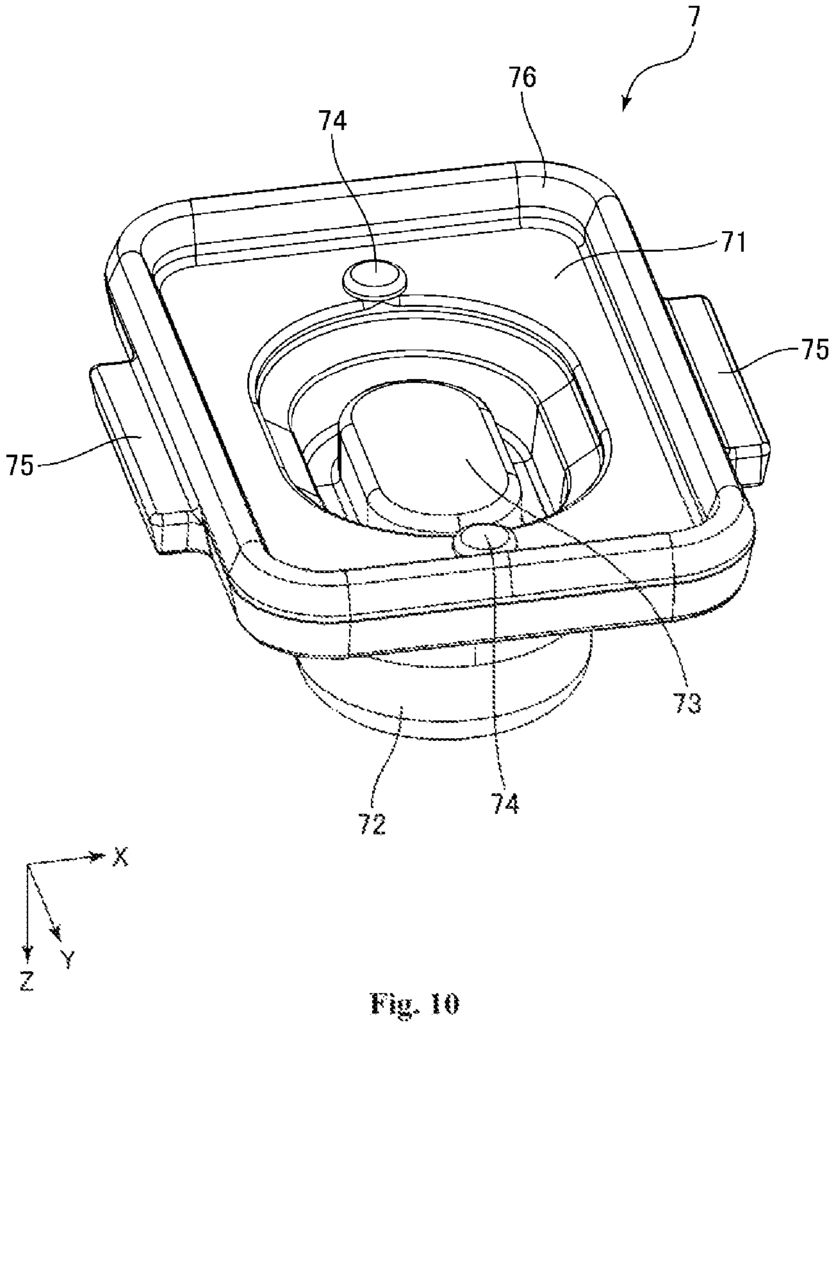
FIG. 10 is a perspective view of a cap shown in FIG. 5 viewed from another angle.
Figure 11:
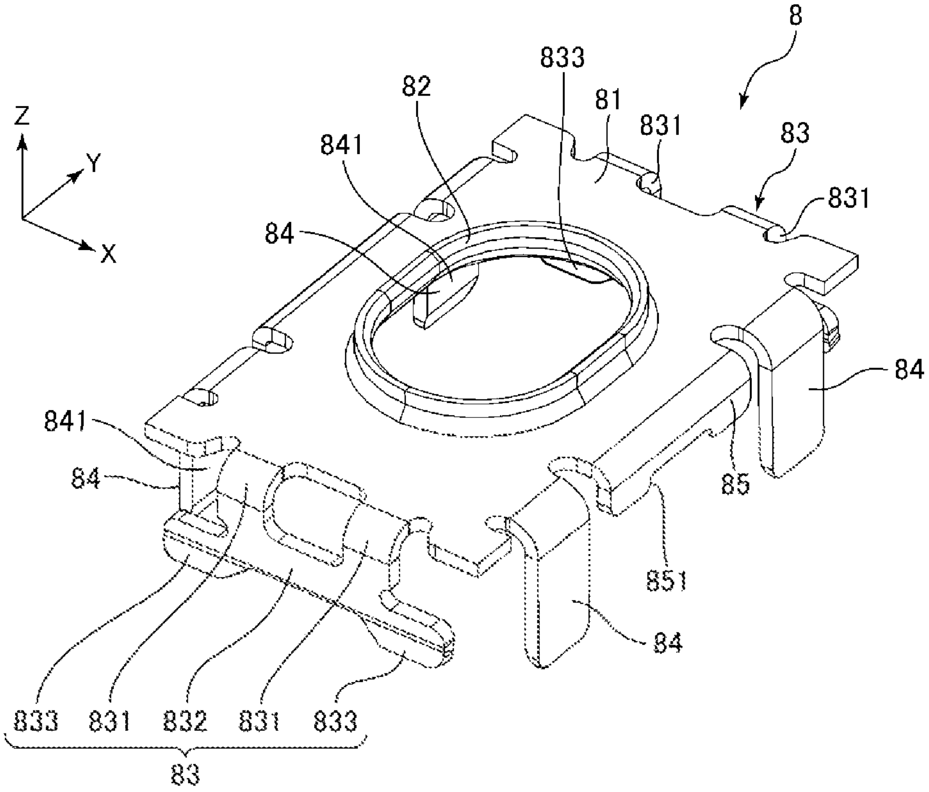
FIG. 11 is a perspective view of a cover shown in FIG. 5 viewed from another angle.
Figure 12:
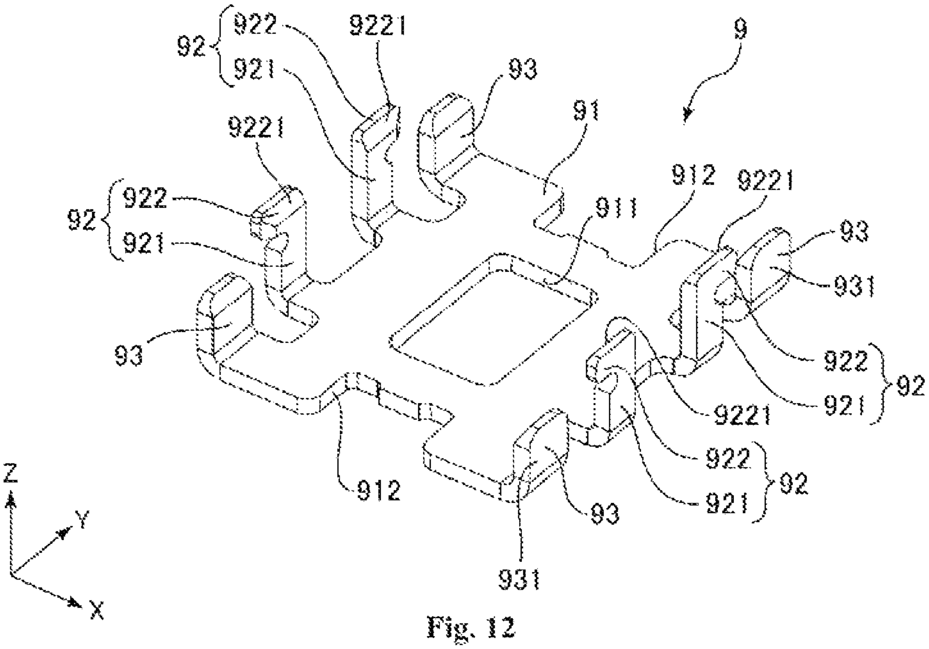
FIG. 12 is a perspective view of a frame shown in FIG. 5 viewed from another angle.
Figure 13:
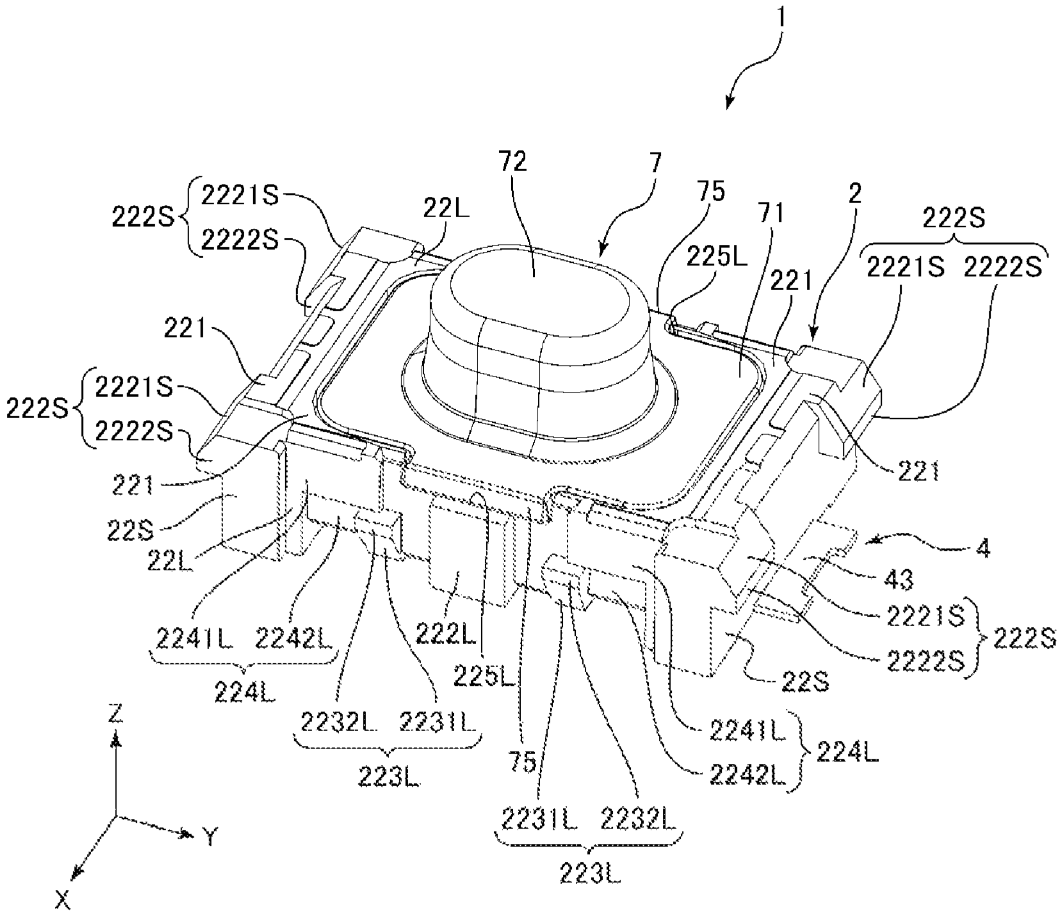
FIG. 13 is a perspective view showing a state that an auxiliary spring, a movable contact, the pressing member and the cap are contained in a containing portion of the case.
Figure 14:
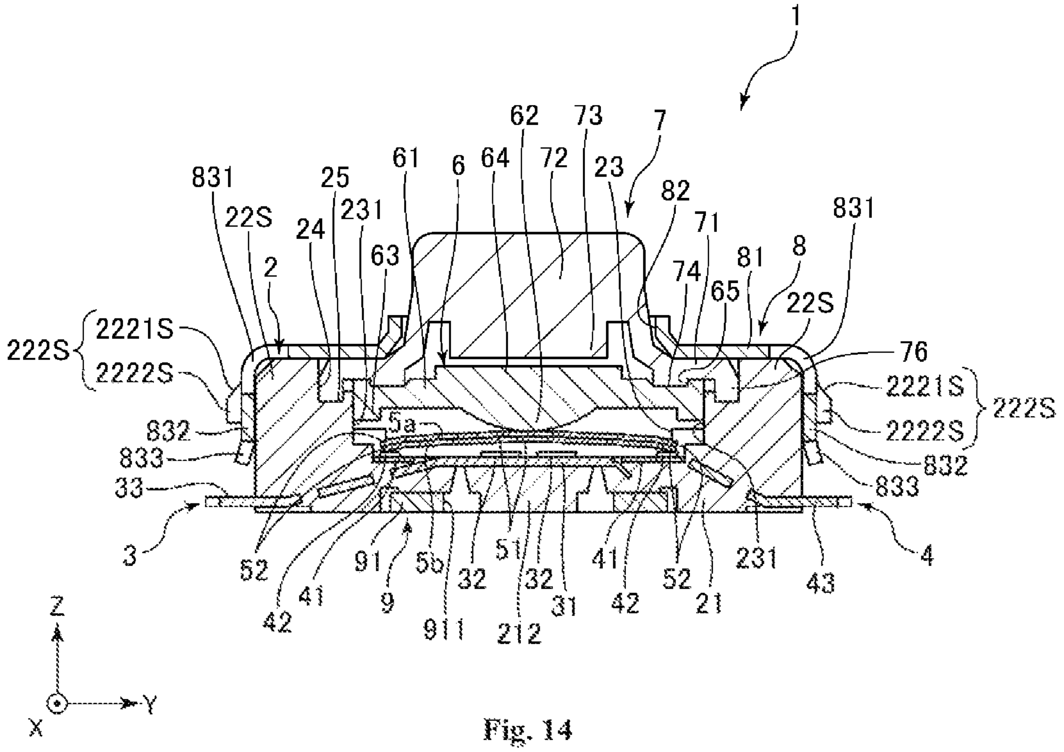
FIG. 14 is a longitudinal cross-sectional view of the push switch taken along an A-A line of FIG. 3 in a natural state that pressing force is not applied to the push switch.
Figure 15:
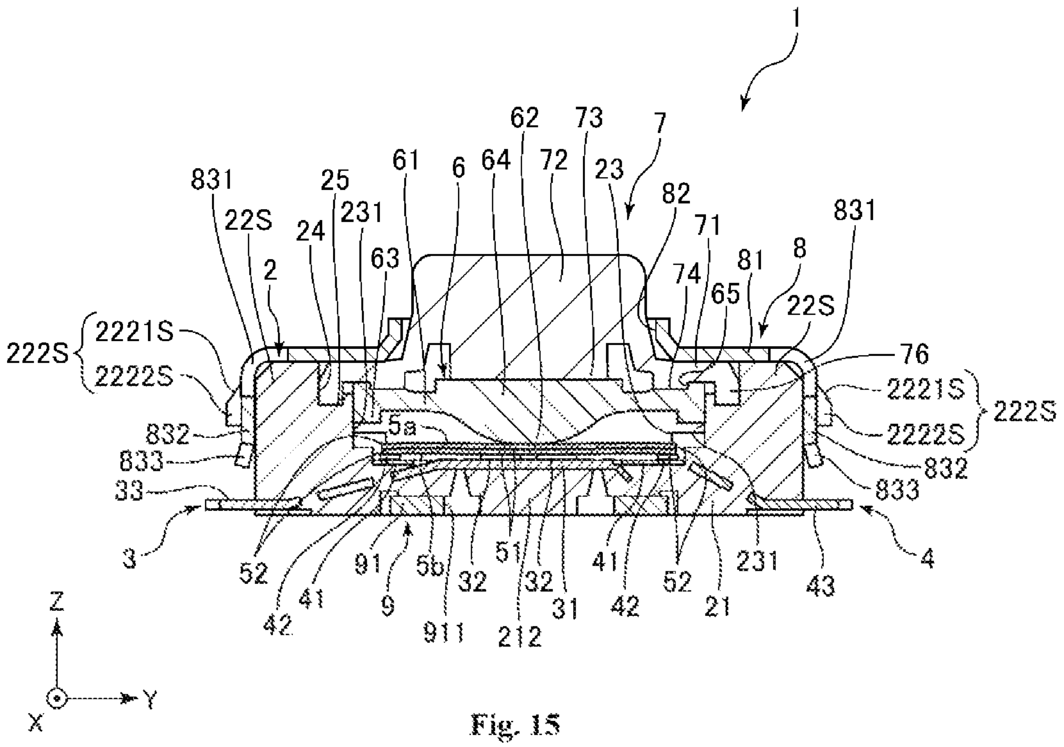
FIG. 15 is a longitudinal cross-sectional view of the push switch taken along the A-A line of FIG. 3 in a pressed state that pressing force exceeding actuating force of the push switch is applied to the push switch.

Hereinafter, the push switch of the present disclosure will be described in detail with reference to FIGS. 3 to 15. FIG. 3 is a perspective view of the push switch according to the present disclosure. FIG. 4 is a perspective view of the push switch shown in FIG. 3 viewed from another angle. FIG. 5 is an exploded perspective view of the push switch shown in FIG. 3. FIG. 6 is a perspective view of a case, a center contact and an outer contact of the push switch shown in FIG. 5 viewed from another angle. FIG. 7 is a perspective view of the case, the center contact and the outer contact of the push switch shown in FIG. 5 viewed from yet another angle. FIG. 8 is a perspective view of the center contact and the outer contact shown in FIGS. 6 and 7. FIG. 9 is a perspective view of a pressing member shown in FIG. 5 viewed from another angle. FIG. 10 is a perspective view of a cap shown in FIG. 5 viewed from another angle. FIG. 11 is a perspective view of a cover shown in FIG. 5 viewed from another angle. FIG. 12 is a perspective view of a frame shown in FIG. 5 viewed from another angle. FIG. 13 is a perspective view showing a state that an auxiliary spring, a movable contact, the pressing member and the cap are contained in a containing portion of the case. FIG. 14 is a longitudinal cross-sectional view of the push switch taken along an A-A line of FIG. 3 in a natural state that pressing force is not applied to the push switch. FIG. 15 is a longitudinal cross-sectional view of the push switch taken along the A-A line of FIG. 3 in a pressed state that pressing force exceeding actuating force of the push switch is applied to the push switch.

A push switch 1 according to the present embodiment of the present disclosure shown in FIGS. 3 and 4 is a switch which can be turned on when pressing force exceeding actuating force of the push switch 1 is applied from a user and turned off when the pressing force applied from the user is released. Further, the push switch 1 has waterproofness and thereby it is possible to prevent water from entering into an inside of the push switch 1. Thus, the push switch 1 can be typically used in an electronic device which may be exposed to water. For example, the push switch 1 can be used as a push switch for a hand-held electronic device such as a smartphone and a controller of a game machine.

As shown in FIGS. 3 and 4, the push switch 1 has a shape whose protruding portion 72 to be pressed by the user protrudes from a low-height and rectangular parallelepiped case 2 toward the upper side. As shown in FIG. 5, the push switch 1 includes the case 2, a center contact 3, an outer contact 4, an auxiliary spring 5*a*, a movable contact 5*b*, a pressing member 6, a cap 7, a cover 8 and a frame 9.

The case 2 is a box-shaped member formed of insulating resin so as to open toward the upper side. Hereinafter, a structure of the case 2 will be described in detail with reference to FIGS. 6 and 7. FIGS. 6 and 7 illustrate the case 2 holding the center contact 3 and the outer contact 4. As shown in FIGS. 6 and 7, the case 2 includes a bottom plate 21, a pair of long wall portions 22L, a pair of short wall portions 22S, a containing portion 23, a receiving recess 24 and a sealing groove 25. The long wall portions 22L and the short wall portions 22S extend from an outer peripheral portion of the bottom plate 21 toward the upper side. The containing portion 23 is defined by the bottom plate 21, the pair of long wall portions 22L and the pair of short wall portions 22S. The receiving recess 24 and the sealing groove 25 are formed on upper end surfaces 221 of the long wall portions 22L and the short wall portions 22S. Further, the sealing groove 25 is formed on a bottom surface of the receiving recess 24.

The case 2 holds the center contact 3 and the outer contact 4 therein in a state that the center contact 3 and the outer contact 4 are insulated from each other. The bottom plate 21 is a plate-like member having a substantially square planar shape (more specifically, a substantially rectangular planar shape) and serves as a base plate of the push switch 1. As shown in FIG. 7, the bottom plate 21 includes a concave portion 211 formed on its lower surface, a protruding portion 212 protruding from the concave portion 211 toward the lower side, a pair of horizontally extending portion 213 formed so as to sandwich the protruding portion 212. The concave portion 211 is formed on the lower surface of the bottom plate 21 in order to contain a bottom plate 91 of the frame 9 therein. A depth of the concave portion 211 is substantially equal to a thickness of the bottom plate 91. The protruding portion 212 is a substantially rectangular protruding portion protruding from a substantially center portion of the concave portion 211 toward the lower side. As shown in FIG. 4, when the frame 9 is attached to the case 2, the protruding portion 212 passes through an opening 911 formed in the bottom plate 91 to prevent the frame 9 from swinging in the plane direction with respect to the case 2. The pair of horizontally extending portions 213 are portions respectively extending linearly from Y-axis direction wall portions of the concave portion 211 toward the inner side. When the frame 9 is attached to the case 2, the horizontally extending portion 213 are engaged with a pair of cutouts 912 respectively formed on a pair of short sides of the bottom plate 91 to prevent the frame 9 from swinging in the X-axis direction with respect to the case 2. Note that the term of "substantially square" used in the specification refers not only to square, but also rectangle, rectangle with rounded corners, a shape in which a part of rectangle is cut out or the like.

Referring back to FIG. 6, the pair of long wall portions 22L respectively extend from long sides of the bottom plate 21 toward the upper side and are formed integrally with the bottom plate 21. Similarly, the pair of short wall portions 22S respectively extend from short sides of the bottom plate 21 toward the upper side and are formed integrally with the bottom plate 21. The containing portion 23 is a concave portion opened toward the upper side and defined by an upper surface of the bottom plate 21, inner surfaces of the long wall portions 22L, and inner surfaces of the short wall portions 22S. In the illustrated aspect, an inner surface of the containing portion 23 forms a substantially square planar shape (more specifically, a substantially rectangular planar shape). Each component of the push switch 1 is contained in the containing portion 23. Thus, the case 2 serves as a housing for containing each component of the push switch 1 in the containing portion 23. Further, the case 2 holds the center contact 3 and the outer contact 4 in the state that the center contact 3 and the outer contact 4 are insulated from each other. The case 2 can be obtained by arranging the center contact 3 and the outer contact 4 in a metal mold having an inner shape corresponding to the shape of the case 2, filling insulating resin into the metal mold, and curing the insulating resin.

As shown in FIGS. 6 and 7, each of the long wall portions 22L includes a center protruding portion 222L formed on its outer surface, a pair of frame lock portions 223L formed on both lateral sides of the center protruding portion 222L, a pair of receiving grooves 224L respectively formed on the outsides of the frame lock portions 223L, and a cutout 225L formed on its upper end surface 221.

The center protruding portion 222L is a rectangular portion formed on a substantially center portion of the outer surface of the long wall portion 22L so as to protrude toward the outside. An upper end surface of the center protruding portion 222L is a flat surface continuous with the cutout portion 225L formed on the upper end surface 221 of the long wall portion 22L. As shown in FIG. 3, when the cover 8 is attached to the case 2, the center protruding portion 222L is engaged with an engagement recess 851 of the cover 8. The engagement concave recess 851 is formed at a lower end portion of a downwardly extending portion 85 extending from a substantially central portion of a long side of the top plate 81 of the cover 8 toward the lower side. With this configuration, it is possible to prevent the cover 8 from swinging in the Y-axis direction on the case 2.

Referring back to FIG. 7, the frame lock portions 223L are tapered portions formed on the outer surface of the long wall portion 22L so as to extend in the Z-axis direction and sandwich the center protruding portion 222L in the Y-axis direction with being spaced apart from the center protruding portion 222L. Each of the frame lock portions 223L has a guide slope 2231L whose height gradually increases from the lower side toward the upper side, and a flat portion 2232L flatly extending from a top of the guide slope 2231L toward the upper side. The guide slope 2231L has a function of guiding a lock portion 922 of an engagement portion 92 (see FIG. 3) extending from the long side of the bottom plate 91 of the frame 9 toward the upper side when the frame 9 is attached to the case 2 from the lower side. When the frame 9 is attached to the case 2 from the lower side, the lock portion 922 slides on the guide slope 2231L, and thereby the engagement portion 92 is opened toward the outside. As a result, the attachment of the frame 9 to the case 2 is guided. The flat portion 2232L has a function of engaging with the lock portion 922 when the frame 9 is attached to the case 2 to prevent the frame 9 from being removed from the case 2. When the frame 9 is attached to the case 2 from the lower side, the lock portion 922 passes over the flat portion 2232L and then the engagement portion 92 elastically recovers toward the inner side. At this time, an upper end surface of the flat portion 2232L is engaged with a lower end surface of the lock portion 922. As a result, the frame 9 is locked with respect to the case 2. At this time, a straight portion 921 of the engagement portion 92 is located in a space between the center protruding portion 222L and the frame lock portion 223L.

Referring back to FIG. 7, each of the receiving grooves 224L is a space defined between the frame lock portion 223L and the short wall portion 22S. The receiving groove 224L includes a first receiving groove 2241L defined by the frame lock portion 223L, the short wall portion 22S and the outer surface of the long wall portion 22L, and a rectangular second receiving groove 2242L formed on a bottom surface of the first receiving groove 2241L (the outer surface of the long wall portion 22L) so as to extend in the Z-axis direction. The first receiving groove 2241L is formed for containing a welding piece 84 of the cover 8 (see FIG. 11)

therein. The second receiving groove 2242L is formed for containing a welding piece 93 of the frame 9 (see FIG. 12) therein.

When the frame 9 is attached to the case 2, the welding pieces 93 extending from each of the long sides of the bottom plate 91 of the frame 9 toward the upper side are respectively located in the second receiving grooves 2242L of the receiving grooves 224L as shown in FIG. 4. Further, when the cover 8 is attached to the case 2, the welding pieces 84 extending from each of the long sides of the top plate 81 of the cover 8 toward the lower side are respectively located in the first receiving grooves 2241L of the receiving grooves 224L. Since a depth (a length in the X-axis direction) of the second receiving groove 2242L is substantially equal to a thickness of the welding piece 93 of the frame 9, the bottom surface of the first receiving groove 2241L and an outer surface (a welding surface) 931 of the welding piece 93 (see FIG. 12) are located on the same plane. Further, an inner surface (a welding surface) 841 (see FIG. 11) of the welding piece 84 of the cover 8 located in the first receiving groove 2241L contacts the bottom surface of the first receiving groove 2241L and the outer surface (welding surface) 931 of the welding piece 93.

Referring back to FIG. 6, the cutout 225L is a portion formed by cutting a substantially center portion in the Y-axis direction of the upper end surface 221 of the long wall portion 22L. In the state that a base portion 71 of the cap 7 is contained in the receiving recess 24 of the case 2, a pair of outwardly extending portions 75 of the base portion 71 are respectively engaged with the cutouts 225L of the long wall portions 22L as shown in FIG. 13. With this configuration, the cap 7 is positioned with respect to the case 2 and it is possible to prevent the cap 7 from swinging in the Y-axis direction with respect to the case 2.

Referring back to FIGS. 6 and 7, each of the short wall portions 22S includes a pair of cover lock portions 222S formed on its outer surface. The cover lock portions 222S are tapered portions respectively formed on X-axis direction end portions of the outer surface of the short wall portion 22S so as to extend in the Y-axis direction. Each of the cover lock portions 222S has a guide slope 2221S whose height gradually increases from the upper side to the lower side, and a flat portion 2222S flatly extending from a top of the guide slope 2221S toward the lower side. The guide slope 2221S has a function of guiding an engagement extending portion 83 (see FIG. 3) extending from the short side of the top plate 81 of the cover 8 toward the lower side when the cover 8 is attached to the case 2 from the upper side. When the cover 8 is attached to the case 2 from the upper side, an inclined portion 833 of the engagement extending portion 83 of the cover 8 slides on the guide slope 2221S, and thereby the engagement extending portion 83 is opened toward the outside. As a result, the attachment of the cover 8 to the case 2 is guided. The flat portion 2222S has a function of engaging with a lock portion 832 of the engagement extending portion 83 when the cover 8 is attached to the case 2 to prevent the cover 8 from being removed from the case 2. When the cover 8 is attached to the case 2 from the upper side, the lock portion 832 passes over the flat portion 2222S and then the engagement extending portion 83 elastically recovers toward the inner side. As a result, a lower end surface of the flat portion 2222S is engaged with an upper end surface of the lock portion 832 of the engagement extending portion 83, and thereby the cover 8 is locked with respect to the case 2.

As shown in FIG. 6, the containing portion 23 is a concave portion defined by the upper surface of the bottom plate 21, the inner surfaces of the long wall portions 22L and the inner surfaces of the short wall portions 22S and having a substantially square planar shape (more specifically, a substantially rectangular planar shape). The containing portion 23 includes a pair of slide grooves 231 and a pair of concave portions 232 respectively formed on bottom surfaces of the slide grooves 231. The slide grooves 231 are grooves respectively formed on inner surfaces of Y-axis direction wall portions of the containing portion 23 along the Z-axis direction. Y-axis direction end portions of a base portion 61 of the pressing member 6 to be described later (see FIG. 9) are respectively contained in the slide grooves 231. When the pressing force is applied to the push switch 1, the pressing member 6 slides toward the lower side along the slide grooves 231. The concave portions 232 are rectangular concave portions respectively formed on the bottom surfaces of the slide grooves 231. When the pressing force is applied to the push switch 1 and the pressing member 6 slides toward the lower side along the slide grooves 231, a pair of protrusions 63 (see FIG. 9) respectively formed on Y-axis direction end portions of a lower surface of the base portion 61 are respectively inserted into the concave portions 232.

Referring back to FIG. 6, the receiving recess 24 is formed on the upper end surfaces 221 of the long wall portions 22L and the short wall portions 22S so as to surround the containing portion 23 and has a function of containing the base portion 71 of the cap 7 therein. The receiving recess 24 has a planar shape corresponding to the shape of the base portion 71. A depth of the receiving recess 24 is equal to or less than a thickness of the base portion 71. In the state that the push switch 1 is assembled, the base portion 71 is contained in the receiving recess 24. Thus, even if strong impact, a high load or high pressure is applied to the push switch 1, a positional shift, inclination or deformation of the cap 7 with respect to the case 2 does not occur because the base portion 71 is held in the receiving recess 24.

The sealing groove 25 is a ring-shaped groove formed on the bottom surface of the receiving recess 24 so as to surround the containing portion 23 and face the sealing protrusion 76 of the cap 7 in the state that the base portion 71 of the cap 7 is contained in the receiving recess 24. A depth of the sealing groove 25 is less than a downward protruding length of the sealing protrusion 76 from the base portion 71. Further, as described above, the depth of the receiving recess 24 of the case 2 is equal to or less than the thickness of the base portion 71. Thus, in the state that the base portion 71 is contained in the receiving recess 24 and the cover 8 is not attached to the case 2, an upper portion of the base portion 71 protrudes from the receiving recess 24 of the case 2 toward the upper side as shown in FIG. 13.

In a state that the cap 7 is held on the case 2 by the cover 8, the sealing protrusion 76 of the cap 7 is contained in the sealing groove 25 with being compressively deformed as described later. As a result, the sealing groove 25 is liquid-tightly sealed by the sealing protrusion 76, thereby providing the waterproofness of the push switch 1. Further, since the sealing protrusion 76 is contained in the sealing groove 25 with being compressively deformed, the positional shift, the inclination or the deformation of the cap 7 with respect to the case 2 does not occur even if the strong impact, the high load or the high pressure is applied to the push switch 1. In the push switch 1 of the present disclosure, the receiving recess 24 and the sealing groove 25 are formed on the upper end surfaces 221 of the long wall portions 22L and the short wall portions 22S of the case 2 for respectively containing the base portion 71 and the sealing protrusion 76 of the cap 7 as described above. Thus, it is possible to provide the waterproofness of the push switch 1 and improve impact resistance, load resistance and pressure resistance of the push switch 1.

FIG. 8 shows a perspective view of the center contact 3 and the outer contact 4 (the pair of contacts) held by the case 2. The center contact 3 and the outer contact 4 (the pair of contacts) are provided on a bottom surface of the containing portion 23 of the case 2 so as to be spaced apart from each other. Each of the center contact 3 and the outer contact 4 is formed of conductive material, more specifically, metallic material such as copper. The center contact 3 and the outer contact 4 are held in the containing portion 23 with being insulated from each other. The center contact 3 and the outer contact 4 serve as fixed electrodes.

Each of the center contact 3 and the outer contact 4 can be obtained by subjecting a punching process and a bending process with respect to one metal plate. The center contact 3 includes a body portion 31, four contact surfaces 32 to be contacted with the movable contact **5*b*, and a terminal portion 33 extending toward the outside of the case 2. The contact surfaces 32 of the center contact 3 are surfaces provided in the containing portion 23 of the case 2 so as to be exposed toward the upper side. When the auxiliary spring 5*a* and the movable contact 5*b* take the second position, the contact surfaces 32 contact with the movable contact 5*b*. Further, the four contact surfaces 32 are located above an upper surface of the body portion 31 in the containing portion 23. The terminal portion 33 of the center contact 3 extends from the short wall portion (the −Y direction short wall portion) 22S of the case 2 toward the outside. The terminal portion 33** serves as an external terminal to be connected to a circuit substrate of the electronic device or the like by solder bonding or the like.

The outer contact 4 includes a body portion 41, four contact surfaces 42 to be contacted with the movable contact **5*b*, and a terminal portion 43 extending toward the outside of the case 2. The contact surfaces 42 of the outer contact 4 are surfaces provided in the containing portion 23 of the case so as to be exposed toward the upper side. When the auxiliary spring 5*a* and the movable contact 5*b* take any of the first position and the second position, the contact surfaces 42 contact with the movable contact 5*b*. Further, the four contact surfaces 42 are located above an upper surface of the body portion 41 in the containing portion 23. The terminal portion 43 of the outer contact 4 extends from the short wall portion (the +Y direction short wall portion) 22S of the case 2 toward the outside. The terminal portion 43** serves as another external terminal to be connected to the circuit substrate of the electronic device or the like by the solder bonding or the like.

As shown in FIG. 6, the center contact 3 is held by the case so that a part of the body portion 31 and the four contact surfaces 32 are exposed toward the upper side in the containing portion 23 of the case 2, and the terminal portion 33 extends from the short wall portion (the −Y direction short wall portion) 22S of the case 2 toward the outside. Further, the outer contact 4 is held by the case 2 so that a part of the body portion 41 and the four contact surfaces 42 are exposed toward the upper side in the containing portion 23, and the termina portion 43 extends from the short wall portion (the +Y direction short wall portion) 22S toward the outside. The four contact surfaces 42 of the outer contact 4 are located at four corners of the bottom plate 21 of the containing portion 23. The center contact 3 and outer contact 4 are held so as to be insulated from each other by the case 2. Further, a laser ablation process (satin treatment) has been subjected to surfaces of the center contact 3 and the outer contact 4 to be contacted with the case 2 to form a number of minute irregularities on the surfaces of the center contact 3 and the outer contact 4 to be contacted with the case 2. With this configuration, it is possible to improve a degree of adhesion of the center contact 3 and the outer contact 4 with respect to the case 2.

Referring back to FIG. 5, each of the auxiliary spring **5*a* and the movable contact is an elastic conductive member having an upwardly convex dome shape and disposed above the center contact 3 and the outer contact 4 in the containing portion 23 of the case 2. The auxiliary spring 5*a* is disposed with being overlapped on the movable contact 5*b* from the upper side. The auxiliary spring 5*a* and the movable contact 5*b* provide the actuating force of the push switch 1 (pressing force required to turn on the push switch 1 from the off state) and returning force (force for returning the push switch 1 from the on state to the off state when the pressing force with respect to the push switch 1 is released) of the push switch 1**.

Each of the auxiliary spring **5*a* and the movable contact 5*b* has the same configuration and should be used in a state that the auxiliary spring 5*a* and the movable contact are overlapped with each other. In the illustrated aspect, the number of the auxiliary springs used with being overlapped on the movable contact 5*b* is one, but the present disclosure is not limited thereto. Depending on required actuating force and required returning force of the push switch 1, the number of auxiliary springs 5*a* used with being overlapped on the movable contact 5*b*** can be appropriately set.

Each of the auxiliary spring **5*a* and the movable contact 5*b* has a shape which can fit in the containing portion 23 of the case 2. Although each of the auxiliary spring 5*a* and the movable contact 5*b* has a substantially square planar shape (more specifically, a substantially rectangular planar shape) in the illustrated aspect, the present disclosure is not limited thereto as long as each of the auxiliary spring 5*a* and the movable contact 5*b* has a shape which can fit in the containing portion 23. For example, in a case where the inner surface of the containing portion 23 of the case 2 forms a planar shape other than the substantially rectangular shape (such as a substantially circular shape, a substantially elliptical shape, and a substantially polygonal shape), each of the auxiliary spring 5*a* and the movable contact 5*b* may have a shape corresponding to the planar shape formed by the inner surface of the containing portion 23 so as to fit in the containing portion 23. Each of the auxiliary spring 5*a* and the movable contact is configured to be able to displace between the first position in which the center contact 3 and the outer contact 4 are in the non-conductive state, and the second position in which the center contact 3 and the outer contact 4** are in the conductive state.

Each of the auxiliary spring **5*a* and the movable contact 5*b* includes a central movable portion 51 to be contacted with the center contact 3, and a pair of outer edge portions 52 respectively formed at both Y-axis direction end portions of the central movable portion 51. As shown in the cross-sectional view of the push switch 1 of FIG. 14, the auxiliary spring 5*a* and the movable contact 5*b* are provided with being overlapped with each other in the containing portion 23 of the case 2. In this state, the central movable portion 51 of the movable contact 5*b* faces the four contact surfaces 32 of the center contact 3 through a gap. Further, the outer edge portions 52 of the movable contact 5*b* contact with the four contact surfaces 42 of the outer contact 4. Namely, in a natural state where the pressing force is not applied to the push switch 1 from the user, both of the auxiliary spring 5***a* and the movable contact 5*b* protrude toward the upper side. In the natural state shown in FIG. 14, both of the auxiliary spring 5*a* and the movable contact 5*b* take the first position. When both of the auxiliary spring 5*a* and the movable contact 5*b* are in the first position, the movable contact 5*b* contacts with the outer contact 4 and does not contact with the center contact 3. Thus, the center contact 3 and the outer contact 4 are in the non-conductive state when both of the auxiliary spring 5*a* and the movable contact 5*b* takes the first position.

In the natural state shown in FIG. 14, when the pressing force is applied to the protruding portion 72 of the cap 7 from the user, the protruding portion 72 is elastically deformed toward the lower side to press the pressing member 6 toward the lower side. Further, the pressing member 6 presses the auxiliary spring 5*a* and the movable contact 5*b* toward the lower side to displace the auxiliary spring 5*a* and the movable contact 5*b* from the first position to the second position as shown in FIG. 15. When the movable contact 5*b* is in the second position, the outer edge portions 52 of the movable contact 5*b* contact with the four contact surfaces 42 of the outer contact 4, and the central movable portion 51 of the movable contact contacts with the contact surfaces 32 of the center contact 3. Namely, the movable contact contacts with both of the center contact 3 and the outer contact 4 when the movable contact is in the second position. Thus, when both of the auxiliary spring 5*a* and the movable contact take the second position, the movable contact 5*b* serves as a conduction path between the center contact 3 and the outer contact 4, and the center contact 3 and the outer contact 4 are in the conductive state. In this regard, a shape of each of the auxiliary spring 5*a* and the movable contact 5*b* is not necessarily limited to the dome shape. The auxiliary spring 5*a* and the movable contact 5*b* may have any shape as long as they can be displaced between the first position in which the center contact 3 and the outer contact 4 are in the non-conductive state and the second position in which the center contact 3 and the outer contact 4 are in the conductive state.

Referring back to FIG. 5, the pressing member 6 is a member formed of hard resin material such as nylon resin. The pressing member 6 is provided on the upper side of the auxiliary spring 5*a* and the movable contact 5*b*. The pressing member 6 has a function of pressing the auxiliary spring 5*a* and the movable contact 5*b* toward the lower side to displace the auxiliary spring 5*a* and the movable contact 5*b* from the first position to the second position. The pressing member 6 is contained in the slide grooves 231 of the containing portion 23 of the case 2 and located on the upper side of the auxiliary spring 5*a* and the movable contact 5*b*. The pressing member 6 is used for efficiently transmitting the pressing force applied to the push switch 1 from the user to the auxiliary spring 5*a* and the movable contact 5*b* to press the auxiliary spring 5*a* and the movable contact 5*b* toward the lower side. As shown in FIGS. 5 and 9, the pressing member 6 includes the base portion 61 having a planar shape (in the illustrated aspect, the planar shape is substantially square) which can fit in the slide grooves 231 of the containing portion 23, a dome-shaped lower protrusion 62 (see FIG. 9) formed on a substantially center portion of a lower surface of the base portion 61 so as to protrude toward the lower side, the pair of protrusions 63 formed on both Y-axis direction end portions of the lower surface of the base portion 61, a rectangular upper protrusion 64 (see FIG. 5) formed on a substantially center portion of an upper surface of the base portion 61 so as to protrude toward the upper side, and a pair of positioning holes 65 formed at both Y-axis direction end portions of the upper surface of the base portion 61.

As shown in FIG. 14, in the state where the push switch 1 is assembled, both Y-axis direction end portions of the base portion 61 are contained in the slide grooves 231 of the containing portion 23 of the case 2. Further, the lower protrusion 62 contacts with the central movable portion 51 of the auxiliary spring 5*a*.

Referring back to FIG. 5, the cap 7 is a member formed of elastic material such as silicon rubber and covers the containing portion 23 of the case 2 from the upper side. The cap 7 covers the containing portion 23 from the upper side to prevent water from entering into the containing portion 23, thereby providing the waterproofness of the push switch 1. Further, since the protruding portion 72 of the cap 7 largely protrudes from the cover 8 toward the upper side in the state that the push switch 1 is assembled, it is possible to make the pressing operation of the user to the push switch 1 easier.

The cap 7 includes the substantially square (more specifically, substantially rectangular) base portion 71, the frustoconical protruding portion 72 formed on the substantially center portion of the base portion 71 so as to protrude toward the upper side, a downwardly protruding portion 73 (see FIG. 10) formed on a lower surface of a top of the protruding portion 72 so as to protrude toward the lower side, a pair of positioning protrusions 74 formed on a lower surface of the base portion 71, the pair of outwardly extending portions formed so as to extend from a pair of long sides of the base portion 71 toward the outside, and the sealing protrusion 76 protruding from a peripheral edge portion of the base portion 71 to liquid-tightly seal the sealing groove 25 of the case 2. The base portion 71 is disposed on the upper end surfaces 221 of the long wall portions 22L and the short wall portions 22S of the case 2, more specifically, contained in the receiving recess 24 of the case 2.

The base portion 71 of the cap 7 has a size and a planar shape corresponding to those of the receiving recess 24 of the case 2. The base portion 71 is contained in the receiving recess 24 formed on the upper end surfaces 221 of the long wall portions 22L and the short wall portions 22S. In the state where the push switch 1 is assembled, the base portion 71 is held between the bottom surface of the receiving recess 24 and the top plate 81 of the cover 8 as shown in FIG. 14.

The protruding portion 72 of the cap 7 is a frustoconical portion protruding from the substantially center portion of the base portion 71 toward the upper side. As shown in FIG. 10, the protruding portion 72 has a hollow structure. The downwardly protruding portion 73 of the cap 7 is a cylindrical portion protruding from the lower surface of the top of the protruding portion 72 toward the lower side. In the natural state of the push switch 1 shown in FIG. 14, the downwardly protruding portion 73 faces the upper protrusion 64 of the pressing member 6.

Since the cap 7 is formed of the elastic material, the protruding portion 72 of the cap 7 is elastically deformed toward the lower side when the user applies the pressing force so as to press the protruding portion 72 toward the lower side. When the pressing force is further applied from this state, the downwardly protruding portion 73 of the cap 7 contacts with the upper protrusion 64 of the pressing member 6 and the pressing member 6 is pressed toward the lower side. Thereafter, the lower protrusion 62 of the pressing member 6 elastically deforms the auxiliary spring 5*a* and the movable contact 5*b* toward the lower side. As a result, the central movable portion 51 of the movable contact 5*b* contacts with the contact surfaces 32 of the center contact 3, and thereby the center contact 3 and the outer contact 4 are in the conductive state through the movable contact 5*b* as shown in FIG. 15.

Referring back to FIG. 10, the pair of positioning protrusions 74 of the cap 7 are formed at positions respectively corresponding to the pair of positioning holes 65 of the pressing member 6. In the natural state of the push switch 1 shown in FIG. 14, the positioning protrusions 74 are respectively fitted into the positioning holes 65. With this structure, it is possible to prevent the cap 7 from swinging in the plane direction with respect to the pressing member 6 and prevent the pressing member 6 from swinging in the vertical direction in the containing portion 23 of the case 2.

The outwardly extending portions 75 are rectangular portion respectively extending from substantially center portions of the long sides of the base portion 71 toward the outside. As shown in FIG. 13, the outwardly extending portions 75 of the cap 7 are respectively engaged with the cutouts 225L of the case 2 in the state that the base portion 71 of the cap 7 is contained in the receiving recess 24 of the case 2. With this configuration, it is possible to position the cap 7 with respect to the case 2 and prevent the cap 7 from swinging in the Y-axis direction with respect to the case 2.

Referring back to FIG. 10, the sealing protrusion 76 is a ring-shaped portion extending from the peripheral edge portion of the base portion 71 toward the lower side and formed so as to make one round of the peripheral edge portion of the base portion 71 for engaging with the sealing groove 25 of the case 2. The sealing protrusion 76 is formed for liquid-tightly sealing the sealing groove 25 of the case 2. The sealing protrusion 76 has a tapered shape whose thickness gradually decreases from the base side (the side contacted with the base portion 71) toward the tip side thereof. Further, a tip end portion of the sealing protrusion 76 is rounded. Furthermore, a protruding length (height) of the sealing protrusion 76 from the base portion 71 toward the lower side is larger than a depth of the sealing groove in a state before the sealing protrusion 76 is compressively deformed in the sealing groove Thus, the tip end portion of the sealing protrusion 76 abuts against a bottom surface of the sealing groove 25 in the state that the base portion 71 is contained in the receiving recess 24 of the case 2. As a result, the upper portion of the base portion 71 protrudes from the receiving recess 24 toward the upper side as shown in FIG. 13.

When the cover 8 is attached to the case 2 from the upper side in this state, the top plate 81 of the cover 8 downwardly presses the base portion 71 of the cap 7 upwardly protruding from the receiving recess 24 of the case 2, thereby holding the cap 7 on the case 2. Further, the pressing force applied to the base portion 71 through the top plate 81 compressively deforms the sealing protrusion 76 in the sealing groove 25 of the case 2, thereby liquid-tightly sealing the sealing groove 25. With this configuration, it is possible to provide the waterproofness of the push switch 1.

Figure 2:
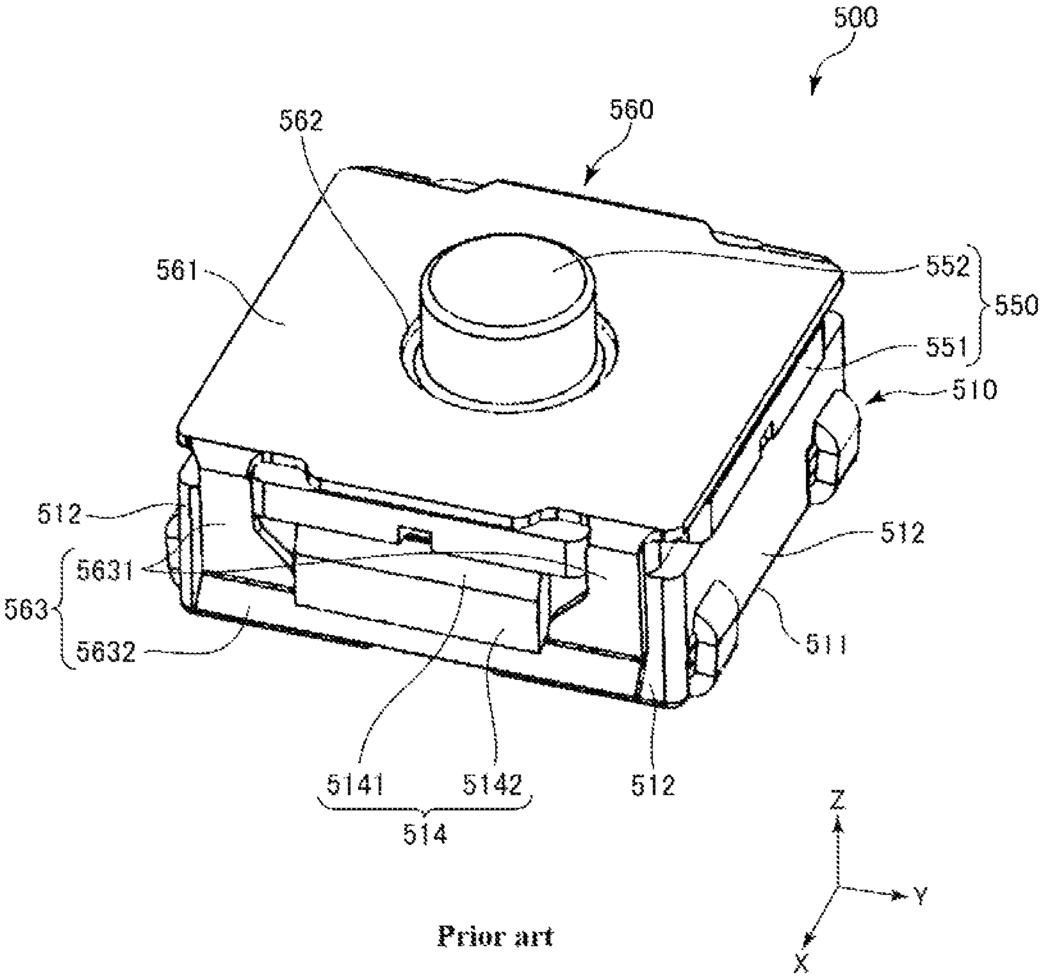
Prior art Fig. 2
FIG. 2 is a perspective view of the conventional push switch shown in FIG. 1.

As described above, in the push switch 1 of the present disclosure, the sealing protrusion 76 of the cap 7 abuts against the bottom surface of the sealing groove 25 of the case 2 to compressively deform the sealing protrusion 76 while the base portion 71 of the cap 7 does not abut against the bottom surface of the sealing groove 25. Further, since the sealing protrusion 76 has the tapered shape whose thickness gradually decreases toward the tip side thereof, a contact area between the sealing protrusion 76 and the bottom surface of the sealing groove 25 is very small. Thus, compared with a case of pressing the base portion 551 of the cap 550 onto the case 510 like the conventional push switch 500 explained with reference to FIGS. 1 and 2, the contact area between the cap and the case is significantly small. As a result, in the push switch 1 of the present disclosure, the pressing force per unit area applied to a portion of the cap 7 (namely, the sealing protrusion 76) abutted against the case 2 becomes very large. Thus, it is possible to significantly improve the degree of adhesion of the sealing protrusion 76 with respect to the sealing groove 25. Therefore, even if the strong impact, the high load or the high pressure is applied to the push switch 1, the positional shift, the inclination or the deformation of the sealing protrusion 76 with respect to the case 2 does not occur. Thus, it is possible to keep the waterproofness of the push switch 1.

Further, in the push switch 1 of the present disclosure, the sealing protrusion 76 of the cap 7 formed of the elastic material is compressively deformed in the sealing groove 25 of the case 2 to realize the waterproofness of the push switch 1. Therefore, any additional parts are not required for realizing the waterproofness and thus it is possible to reduce the number of parts of the push switch 1.

Referring back to FIG. 5, the cover 8 is attached to the case 2 from the upper side to hold the cap 7 on the case 2. The cover 8 has a function of holding the cap 7 on the case 2 by downwardly pressing the base portion 71 of the cap 7 from the upper side. The cover 8 can be obtained by subjecting a punching process and a bending process with respect to one metal plate. In this regard, it is preferable that constituent material of the cover 8 is metallic material having a high hardness (Vickers hardness) such as stainless steel (for example, martensitic stainless steel and ferritic stainless steel), chromium molybdenum steel and titanium alloy. More preferably, the constituent material of the cover 8 is the stainless steel having the high hardness and an excellent rust resistance.

As shown in FIG. 11, the cover 8 includes the top plate 81 having a substantially square planar shape (more specifically, a substantially rectangular planar shape), an opening 82 formed in the top plate 81 and through which the protruding portion 72 of the cap 7 passes, the pair of engagement extending portion 83 respectively extending from the pair of opposite short sides (sides extending in the X direction in the drawing) of the top plate 81 toward the lower side, the pair of welding pieces 84 extending from each of the pair of opposite long sides (sides extending in the Y direction in the drawing) of the top plate 81 toward the lower side, and the downwardly extending portions 85 respectively extending from the substantially center portions of the pair of opposite long sides of the top plate 81.

The top plate 81 has a function of holding the cap 7 on the case 2 by downwardly pressing the base portion 71 of the cap 7 from the upper side in the state that the push switch 1 is assembled. Further, since the top plate 81 presses the base portion 71 toward the lower side, the sealing protrusion 76 of the cap 7 is compressively deformed in the sealing groove 25 of the case 2, and thereby the sealing groove 25 is liquid-tightly sealed. The top plate 81 is a plate-like portion having a planar shape (in the illustrated form, a substantially square planar shape) corresponding to the base portion 71. The opening 82 is formed in a substantially center portion of the top plate 81 so that the protruding portion 72 of the cap 7 can pass through the opening 82 toward the upper side in the state that the push switch 1 is assembled. Although a shape of the opening 82 is substantially elliptical corresponding to a shape of the protruding portion 72 in the illustrated aspect, the shape of the opening 82 is not particularly limited as long as the protruding portion 72 can pass through the opening 82 toward the upper side.

The engagement extending portions 83 are formed for locking the cover 8 with respect to the case 2. As shown in FIG. 11, the engagement extending portions 83 respectively extend from the opposite short sides (sides extending in the X direction in the drawing) of the top plate 81 toward the lower side. Each of the engagement extending portions 83 includes a pair of leg portions 831 extending from the short side of the top plate 81 toward the lower side, a lock portion 832 for connecting lower end portions of the leg portions 831, and a pair of inclined portions 833 formed at a lower end portion of the lock portion 832.

The leg portions 831 linearly extend from the short side of the top plate 81 toward the lower side with being separated apart from each other. A separation distance between outer lateral surfaces of the leg portions 831 is substantially equal to a separation distance between inner lateral surfaces of the cover lock portions 222S formed on the outer surface of the short wall portion 22S of the case 2. Thus, when the cover 8 is attached to the case 2, the outer lateral surfaces of the leg portions 831 are respectively engaged with the inner lateral surfaces of the cover lock portions 222S as shown in FIG. 3, thereby preventing the cover 8 from swinging in the X-axis direction with respect to the case 2.

Referring back to FIG. 11, the lock portion 832 is a portion elongated in the X-axis direction and connects the lower end portions of the leg portions 831. As shown in FIGS. 3 and 4, the cover 8 is locked with respect to the case 2 when the lower end surfaces of the flat portions 2222S of the cover lock portions 222S formed on the outer surfaces of the short wall portions 22S are engaged with upper end surfaces of the lock portions 832. The inclined portions 833 are formed at the lower end portion of the lock portion 832 so as to extend in the obliquely lower (outer) direction with being spaced apart from each other. An inclination of the inclined portions 833 is substantially equal to an inclination of the guide slopes 2221S of the cover lock portions 222S formed on the outer surface of the short wall portion 22S. Thus, when the cover 8 is pressed onto the case 2 from the upper side, the inclined portions 833 of the cover 8 respectively slide on the guide slopes 2221S, and thereby the engagement extending portion 83 of the cover 8 is opened toward the outside. Therefore, the inclined portions 833 have a function of facilitating the attachment of the cover 8 with respect to the case 2 at the time of assembling the push switch 1.

Referring back to FIG. 11, the welding pieces 84 are plate-like portions extending from each of the long sides of the top plate 81 toward the lower side with being spaced apart from each other. As shown in FIG. 4, when the cover 8 is attached to the case 2, the welding pieces 84 are respectively contained in the first receiving grooves 2241L formed on the outer surface of the long wall portion 22L of the case 2. Referring back to FIG. 11, an inner surface of each of the welding pieces 84 is a welding surface 841 to be welded to the welding piece 93 of the frame 9. The downwardly extending portion 85 is a plate-like portion extending from each of the long sides of the top plate 81 toward the lower side. The downwardly extending portion 85 is located between the welding pieces 84 with being spaced from the welding pieces 84. The downwardly extending portion 85 includes an engagement recess 851 formed on a lower end portion thereof. As shown in FIG. 4, when the cover 8 is attached to the case 2, the engagement recess 851 of the downwardly extending portion 85 is engaged with the center protruding portion 222L formed on the outer surface of the long wall portion 22L of the case 2, thereby preventing the cover 8 from swinging in the Y-axis direction on the case 2. Further, the downwardly extending portion 85 covers the outwardly extending portion 75 of the cap 7 from the outside.

When the cover 8 is attached to the case 2, the upper end surfaces 221 of the long wall portions 22L and the short wall portions 22S of the case 2 are supported from the outside by the top plate 81 of the cover 8. Further, upper portions of the long wall portions 22L are supported from the outside by the welding pieces 84 and the downwardly extending portions 85 of the cover 8, and upper portions of the short wall portions 22S are supported from the outside by the engagement extending portions 83 of the cover 8. As a result, an upper portion of the case 2 is reinforced by the cover 8.

Referring back to FIG. 5, the frame 9 is attached to the case 2 from the lower side and has a function of supporting the case 2 from the lower side. The frame 9 can be obtained by subjecting a punching process and a bending process to one metal plate. In this regard, it is preferable that constituent material of the frame 9 is the metallic material having the high hardness (Vickers hardness) such as stainless steel (for example, martensitic stainless steel and ferritic stainless steel), chromium molybdenum steel and titanium alloy. More preferably, the constituent material of the frame 9 is the stainless steel having the high hardness and the excellent rust resistance.

As shown in FIG. 12, the frame 9 includes the bottom plate 91 having a substantially square planar shape (more specifically, a substantially rectangular planar shape), the pair of engagement portions 92 extending from each of the opposite long sides of the bottom plate 91 toward the upper side, and the pair of welding pieces 93 extending from each of the opposite long sides of the bottom plate 91 toward the upper side.

The bottom plate 91 is a plate-like portion having a shape corresponding to the concave portion 211 formed on the bottom surface of the bottom plate 21 of the case 2 described in detail with reference to FIG. 7. As shown in FIG. 4, when the frame 9 is attached to the case 2, the bottom plate 91 is contained in the concave portion 211, and thereby the frame 9 is integrated with the case 2. Thus, it is possible to prevent deformation such as distortion and warpage of the case 2 when the strong impact, the high load or the high pressure is applied to the push switch 1, thereby preventing the characteristics of the push switch 1 from being changed by the deformation of the case 2. Therefore, the push switch 1 of the present disclosure has the excellent impact resistance, the excellent load resistance, and the excellent pressure resistance.

Referring back to FIG. 12, the bottom plate 91 has the opening 911 formed in a substantially center portion of the bottom plate 91, and the pair of cutouts 912 respectively formed in the opposite short sides of the bottom plate 91. The opening 911 has a shape corresponding to the protruding portion 212 formed on the bottom surface of the bottom plate 21 of the case 2. The cutouts 912 are respectively formed the opposite short sides of the bottom plate 91 so as to sandwich the opening 911 in the Y-axis direction. Each of the cutouts 912 has a shape corresponding to each of the horizontally extending portions 213 formed on the bottom surface of the bottom plate 21. As shown in FIG. 4, when the frame 9 is attached to the case 2, the opening 911 is engaged with the protruding portion 212, and the cutouts 912 are respectively engaged with the horizontally extending portions 213. With this configuration, it is possible to prevent the frame 9 from swinging in the plane direction with respect to the case 2.

Referring back to FIG. 12, the engagement portions 92 are formed so as to extend from each of the opposite long sides of the bottom plate 91 toward the upper side. Each of the engagement portions 92 includes the straight portion 921 linearly extending from the long side of the bottom plate 91 toward the upper side, and the lock portion 922 formed on a tip end portion of the straight portion 921. As shown in FIGS. 3 and 4, when the frame 9 is attached to the case 2, the straight portion 921 is located in the space between the center protruding portion 222L and the frame lock portion 223L formed on the outer surface of the long wall portion 22L of the case 2. Since the straight portion 921 is held between the center protruding portion 222L and the frame lock portion 223L as described above, it is possible to prevent the frame 9 from swinging in the Y-axis direction with respect to the case 2.

The lock portion 922 is a portion extending from the tip end portion of the straight portion 921 toward the outside. Further, a guide slope 9221 is formed on an inner portion of a tip end portion of the lock portion 922 as shown in FIG. 12. An inclination of the guide slope 9221 is substantially equal to an inclination of the guide slope 2231L of the frame lock portion 223L formed on the outer surface of the long wall portion 22L of the case 2. Thus, when the frame 9 is pressed onto the case 2 from the lower side, the lock portion 922 slides on the guide slope 2231L, and thereby the engagement portion 92 is opened toward the outside. Therefore, the guide slope 9221 has a function of facilitating the attachment of the frame 9 with respect to the case 2 when the push switch 1 is assembled. Further, the frame 9 is locked with respect to the case 2 by engaging upper end surfaces of the flat portion 2232L formed on the outer surface of the long wall portion 22L with lower end surfaces of the lock portions 922 as shown in FIGS. 3 and 4.

The welding pieces 93 are plate-like portions linearly extending from both end portions of each of the opposite long sides of the bottom plate 91 toward the upper side with being spaced apart from each other. The welding pieces 93 are respectively contained in the second receiving grooves 2242L formed on the outer surface of the long wall portion 22L of the case 2. An outer surface of each of the welding pieces 93 is the welding surface 931 which should be welded to the welding surface 841 of the corresponding welding piece 84 of the cover 8. As shown in FIG. 4, when the frame 9 is attached to the case 2 from the lower side, the welding pieces 93 are respectively contained in the second receiving grooves 2242L of the case 2. Since the depth of the second receiving groove 2242L is substantially equal to the thickness of the welding piece 93 as described above, the bottom surfaces of the first receiving grooves 2241L of the case 2 and upper surfaces of the welding pieces 93 are positioned in the substantially same plane. When the cover 8 is attached to the case 2 from the upper side in the state that the frame 9 is attached to the case 2, the welding pieces 84 are respectively contained in the first receiving grooves 2241L.

In this state, the welding pieces 84 of the cover 8 respectively contained in the first receiving grooves 2241L of the case 2 are respectively located on the welding pieces 93 of the frame 9 respectively contained in the second receiving grooves 2242L of the case 2. Further, the welding surfaces 931 of the welding pieces 93 respectively contact with the welding surfaces 841 of the welding pieces 84. Furthermore, the welding surfaces 931 and the welding surfaces 841 are welded to each other by any welding process such as a thermal welding process or a laser welding process, typically by the laser welding process to firmly fix the cover 8 and the frame 9. With this configuration, the case 2 is firmly held between the cover 8 and the frame 9 which are welded to each other.

When the frame 9 is attached to the case 2, the bottom plate 21 of the case 2 is supported from the outside by the bottom plate 91 of the frame 9 and the lower portions of the long wall portions 22L of the case 2 are supported from the outside by the engagement portions 92 and the welding pieces 93 of the frame 9. As a result, a lower portion of the case 2 is reinforced by the frame 9.

In the push switch 1 of the present disclosure, since the welding surfaces 931 of the welding pieces 93 of the frame 9 are respectively welded to the welding surfaces 841 of the welding pieces 84 of the cover 8, the cover 8 and the frame 9 are firmly fixed to each other for holding the case 2 from the upper side and lower side. Since the cover 8 is firmly fixed to the frame 9 integrated with the case 2, it is possible to prevent the engagement of the cover 8 with respect to the case 2 from being loosened even if the strong impact, the high load or the high pressure is applied to the push switch 1. Therefore, the pressure with respect to the sealing protrusion 76 of the cap 7 in the sealing groove 25 of the case 2 is not loosened, and thereby it is possible to keep the sealing of the sealing groove 25 due to the sealing protrusion 76. For the reasons stated above, it is possible to keep the waterproofness of the push switch 1 even if the strong impact, the high load or the high pressure is applied to the push switch 1.

Further, in the push switch 1 of the present disclosure, since the case 2 is supported and reinforced by the cover 8 and the frame 9 from the upper side, the lower side and the lateral sides, it is possible to suppress the deformation such as distortion and warpage of the case 2 when the strong impact, the high load or the high pressure is applied to the push switch 1. In particular, since each of the cover 8 and the frame 9 is formed of the metallic material (the stainless steel, etc.) having the higher hardness (Vickers hardness) than that of the insulating resin which is the constituent material of the case 2, it is possible to reinforce the case 2 by supporting the case 2 with the cover 8 and the frame 9 from the upper side, the lower side and the lateral sides of the case 2 to more effectively suppress the deformation of the case 2. As described above, in the push switch 1 of the present disclosure, the case 2 is sandwiched by the cover 8 and the frame 9 from the upper side and the lower side, and the cover 8 and the frame 9 are welded to each other to firmly fix the cover 8 and the frame 9. Thus, it is possible to prevent the deformation of the case 2. Therefore, the push switch 1 of the present disclosure has the excellent impact resistance, the excellent load resistance, and the excellent pressure resistance.

Hereinafter, a procedure for assembling the above-described push switch 1 will be described. First, the auxiliary spring **5*a* and the movable contact 5*b* are contained in the containing portion 23 of the case 2 in which the center contact 3 and the outer contact 4 are hold. In this state, the auxiliary spring 5*a* is overlapped on the movable contact 5*b*. Next, both end portions of the base portion 61 of the pressing member 6 are respectively inserted into the slide grooves 231 of the containing portion 23 to place the pressing member 6 on the auxiliary spring 5*a*. Next, the base portion 71 is contained in the receiving recess 24 of the case 2. At this time, the sealing protrusion 76 of the cap 7 is inserted into the sealing groove 25 formed on the receiving recess 24** of the case 2. FIG. 13 is a perspective view showing the state that the base portion 71 is contained in the receiving recess 24.

As described above, the protruding length of the sealing protrusion 76 of the cap 7 from the base portion 71 toward the lower side in the state that the sealing protrusion 76 is not compressively deformed is larger than the depth of the sealing groove 25 of the case 2 and the depth of the receiving recess 24 of the case 2 is equal to or less than the thickness of the base portion 71. Thus, the upper portion of the base portion 71 protrudes from the receiving recess 24 toward the upper side as shown in FIG. 13. In this state, the frame 9 is attached to the case 2 from the lower side. Thereafter, the cover 8 is attached to the case 2 from the upper side, and thereby the cover 8 is engaged with the case 2. When the cover 8 is engaged with the case 2, the top plate 81 of the cover 8 downwardly presses the upper portion of the base portion 71 protruding from the receiving recess 24 toward the upper side to hold the cap 7 on the case 2. Further, the sealing protrusion 76 is compressively deformed in the sealing groove 25 by the pressing force applied to the base portion 71 through the top plate 81. The compressive deformation of the sealing protrusion 76 in the sealing groove 25 liquid-tightly seals the sealing groove 25, thereby providing the waterproofness of the push switch 1.

Although the frame 9 is attached to the case 2 after the auxiliary spring 5*a*, the movable contact 5*b*, the pressing member 6 and the cap 7 are contained in the case 2 in the above description, the present disclosure is not limited thereto. The frame 9 may be attached to the case 2 before the auxiliary spring 5*a*, the movable contact 5*b*, the pressing member 6 and the cap 7 are contained in the case 2.

Further, in the state where the cover 8 and the frame 9 are attached to the case 2, the welding pieces 93 of the frame 9 are respectively located on the inside of the welding pieces 84 of the cover 8 and the welding surfaces 931 of the welding pieces 93 respectively contact with the welding surfaces 841 of the welding pieces 84 as shown in FIG. 4. Next, the welding process (typically, the laser welding process) is subjected to the welding surfaces 931 and the welding surfaces 841. As a result, the welding surfaces 931 and the welding surfaces 841 are welded to each other, and thereby the cover 8 and the frame 9 are firmly fixed to each other. When the case 2 is sandwiched and held from the upper side and the lower side by the cover 8 and the frame 9 firmly fixed to each other, the assembly of the push switch 1 is completed.

Next, the movement of the push switch 1 will be described in detail with reference to FIGS. 14 and 15. FIG. 14 shows a longitudinal cross-sectional view of the push switch 1 taken along an A-A line of FIG. 3 in the natural state that the pressing force is not applied to the push switch 1. FIG. 15 shows a longitudinal sectional view of the push switch 1 taken along the A-A line of FIG. 3 in a pressed state that pressing force exceeding the actuation force of the push switch 1 is applied to the push switch 1.

In the natural state of the push switch 1, the auxiliary spring 5*a* and the movable contact 5*b* are upwardly convex as shown in FIG. 14. In the state shown in FIG. 14, both of the auxiliary spring 5*a* and the movable contact 5*b* take the first position. In the first position, the outer edge portions 52 of the movable contact 5*b* contact with the contact surfaces 42 of the outer contact 4. On the other hand, the central movable portion 51 of the movable contact 5*b* does not contact with the contact surfaces 32. Namely, the movable contact 5*b* contacts with the outer contact 4 and does not contact with the center contact 3 when the movable contact 5*b* is in the first position. Thus, the center contact 3 and the outer contact 4 are in the non-conductive state when both of the auxiliary spring 5*a* and the movable contact 5*b* are in the first position.

In the natural state shown in FIG. 14, when the pressing force is applied to the protruding portion 72 of the cap 7 from the user, the protruding portion 72 is elastically deformed toward the lower side. When the pressing force is further applied in this state, the downwardly protruding portion 73 of the cap 7 contacts with the upper protrusion 64 of the pressing member 6 and the pressing member 6 is pressed toward the lower side, and thereby the central movable portions 51 of the auxiliary spring 5*a* and the movable contact 5*b* are elastically deformed toward the lower side by the lower protrusion 62 of the pressing member 6. As a result, both of the auxiliary spring 5*a* and the movable contact 5*b* are displaced to the second position, and thereby the push switch 1 is shifted to the pressed state shown in FIG. 15.

In the pressed state shown in FIG. 15, both of the auxiliary spring 5*a* and the movable contact 5*b* takes the second position. In the second position, the outer edge portions 52 of the movable contact 5*b* contact with the contact surfaces 42 of the outer contact 4. Further, the central movable portion 51 of the movable contact 5*b* contacts with the contact surfaces 32 of the center contact 3. Namely, the movable contact 5*b* contacts with both of the center contact 3 and the outer contact 4 when the movable contact 5*b* is in the second position. Thus, the movable contact 5*b* serves as the conduction path between the center contact 3 and the outer contact 4 when both of the auxiliary spring 5*a* and the movable contact 5*b* are in the second position. Thus, the center contact 3 and the outer contact 4 are in the conductive state. When the pressing force with respect to the protruding portion 72 of the cap 7 is released in the pressed state shown in FIG. 15, the push switch 1 returns to the natural state shown in FIG. 14 due to the returning force of the push switch 1 provided by the elastic restoring force of the auxiliary spring 5*a* and the movable contact 5*b*.

Although the push switch of the present disclosure has been described based on the illustrated embodiment, the present disclosure is not limited thereto. Each configuration of the present disclosure can be replaced with any configuration capable of performing the same function or any configuration can be added to each configuration of the present disclosure.

It should be noted that a person having ordinary skill in the art in the field and art to which the present disclosure belongs may modify the described configuration of the push switch of the present disclosure without significantly departing from the principle, concept, and scope of the present disclosure, and push switches having modified configurations are also involved within the scope of the present disclosure.

In addition, the number and types of components of the push switch shown in FIGS. 3 to 15 are merely illustrative examples, and the present disclosure is not necessarily limited thereto. An aspect in which any component is added or combined or any component is omitted without departing from the principle and intent of the present disclosure is also involved within the scope of the present disclosure.

Figure 16:
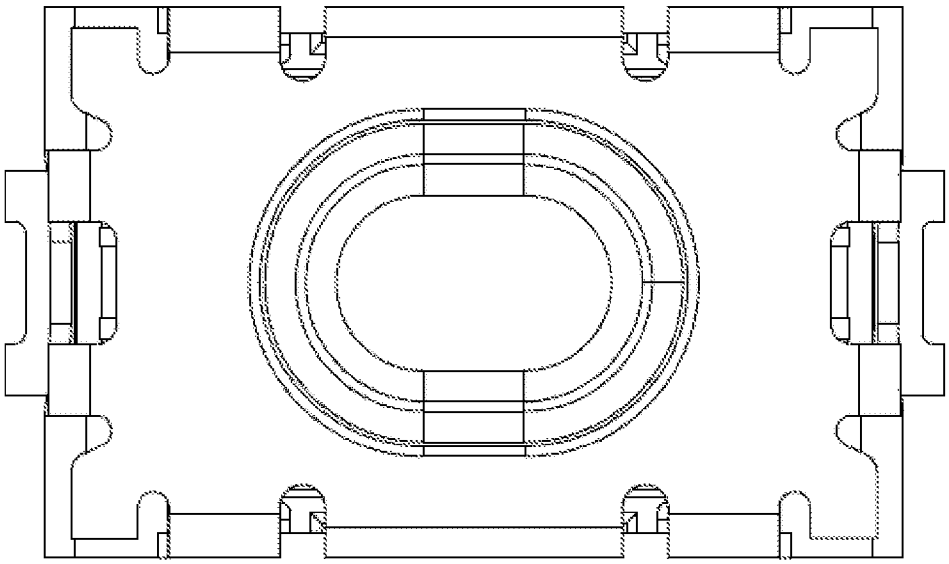
FIG. 16 is a planar view of the push switch according to the present disclosure.
Figure 17:
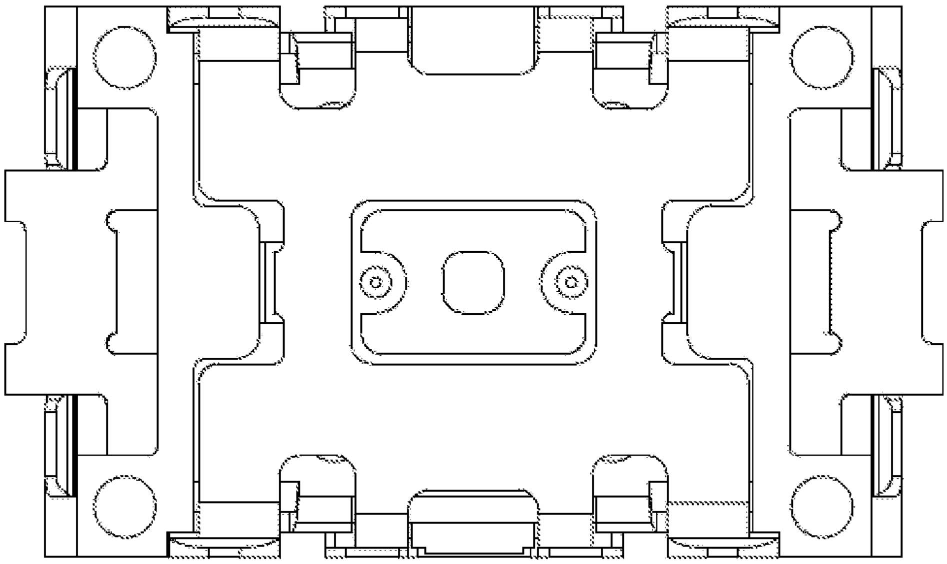
FIG. 17 is a bottom view of the push switch according to the present disclosure.
Figure 18:
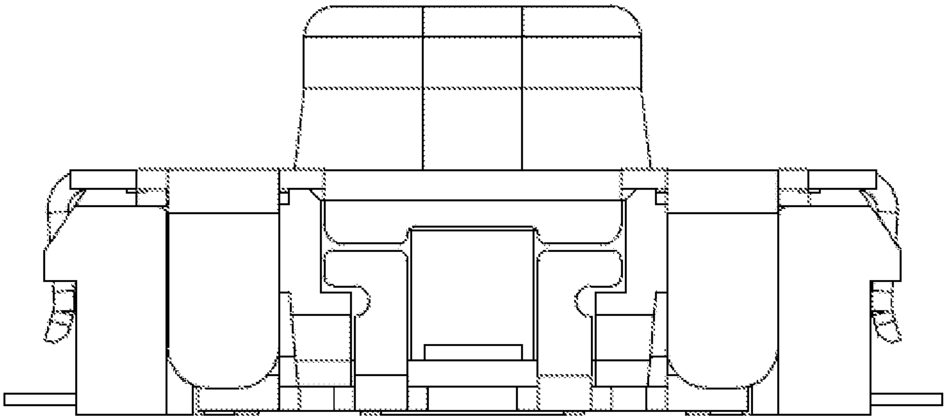
FIG. 18 is a front view of the push switch according to the present disclosure.

Further, for reference, precise six-sided views of the push switch of the present disclosure are shown in FIGS. 16-21. FIG. 16 is a planar view of the push switch according to the present disclosure. FIG. 17 is a bottom view of the push switch according to the present disclosure. FIG. 18 is a front view of the push switch according to the present disclosure.

Figure 19:
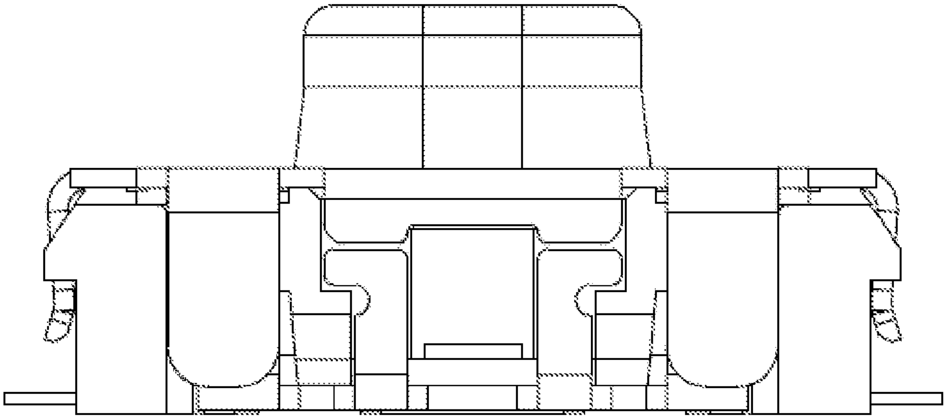
FIG. 19 is a rear view of the push switch according to the present disclosure.
Figure 20:
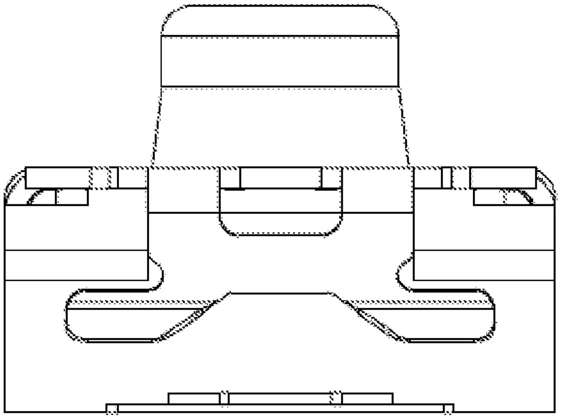
FIG. 20 is a left side view of the push switch according to the present disclosure.
Figure 21:
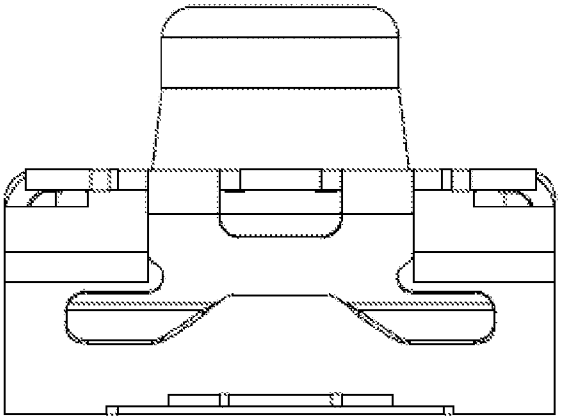
FIG. 21 is a right side view of the push switch according to the present disclosure.

FIG. 19 is a rear view of the push switch according to the present disclosure. FIG. 20 is a left side view of the push switch according to the present disclosure. FIG. 21 is a right side view of the push switch according to the present disclosure.

The invention claimed is:

1. A push switch, comprising:

a case including a containing portion defined by a bottom plate and a plurality of wall portions extending from the bottom plate toward an upper side, and a sealing groove formed on upper end surfaces of the plurality of wall portions;

a pair of contacts provided on the bottom plate of the containing portion so as to be spaced apart from each other;

a movable contact which is disposed above the pair of contacts in the containing portion and can be displaced between a first position in which the pair of contacts are in a non-conductive state and a second position in which the pair of contacts are in a conductive state;

a cap for covering the containing portion of the case from the upper side, the cap including a base portion disposed on the upper end surfaces of the plurality of wall portions of the case, a protruding portion protruding from the base portion toward the upper side, and a sealing protrusion protruding from a peripheral edge portion of the base portion toward a lower side for liquid-tightly sealing the sealing groove of the case; and a cover attached to the case from the upper side so as to hold the cap on the case, the cover including a top plate and an opening which is formed in the top plate and through which the protruding portion of the cap passes, wherein the sealing protrusion of the cap is compressively deformed in the sealing groove of the case in a state that the cap is held on the case by the cover, and thereby the sealing groove of the case is liquid-tightly sealed, wherein the case further includes a pair of cover lock portions formed on each of a pair of opposite wall portions among the plurality of wall portions and being apart from each other, wherein the cover further includes a pair of engagement extending portions respectively extending from a pair of opposite sides of the top plate toward the lower side, wherein each of the pair of engagement extending portions includes a pair of leg portions extending from a side of the top plate toward the lower side and being spaced part from each other, and a lock portion for connecting lower end portions of the leg portions, wherein outer lateral surfaces of the pair of the leg portions of the engagement extending portions extending from the side of the top plate are respectively engaged with inner lateral surfaces of the pair of the cover lock portions formed on a wall portion of the case, and wherein an upper end surface of the lock portion of the engagement extending portion extending from the side of the top plate is engaged with lower end surfaces of the pair of the cover lock portions formed on the wall portion of the case.

2. The push switch as claimed in claim 1, wherein the case further includes a receiving recess formed on the upper end surfaces of the plurality of wall portions so as to surround the containing portion, and wherein the base portion of the cap is contained in the receiving recess of the case.

3. The push switch as claimed in claim 2, wherein the sealing groove of the case is formed on a bottom surface of the receiving recess so as to surround the containing portion, and wherein the sealing protrusion of the cap is formed so as to make one round of the peripheral edge portion of the base portion of the cap and engaged with the sealing groove.

4. The push switch as claimed in claim 2, wherein the base portion of the cap protrudes from the receiving recess of the case toward the upper side in a state that the base portion of the cap is contained in the receiving recess of the case, and wherein the top plate of the cover presses the base portion of the cap toward the lower side when the cover is attached to the case, and thereby the sealing protrusion of the cap is compressively deformed in the sealing groove of the case.

5. The push switch as claimed in claim 1, wherein a protruding length of the sealing protrusion of the cap from the base portion toward the lower side in a state before the sealing protrusion of the cap is compressively deformed in the sealing groove is larger than a depth of the sealing groove of the case.

6. The push switch as claimed in claim 1, wherein the cap further includes a pair of outwardly extending portions respectively extending from a pair of opposite sides of the base portion toward an outside, wherein the case further includes a pair of cutouts formed on the upper end surfaces of the plurality of wall portions, and wherein the pair of outwardly extending portions of the cap are respectively engaged with the pair of cutouts of the case.

7. The push switch as claimed in claim 1, further comprising a frame attached to the case from the lower side, wherein the frame includes a bottom plate, and wherein the case is held between the cover and the frame.

8. The push switch as claimed in claim 7, wherein the top plate of the cover has a substantially square planar shape, wherein the cover further includes a pair of welding pieces extending from each of another pair of opposite sides of the top plate toward the lower side, wherein the bottom plate of the frame has a substantially square planar shape, wherein the frame further includes a pair of welding pieces extending from each of opposite sides of the bottom plate toward the upper side, and wherein the pair of welding pieces of the cover are respectively welded to the pair of welding pieces of the frame, and thereby the case is held between the cover and the frame welded to each other.

9. The push switch as claimed in claim 8, wherein the welding pieces of the cover are laser-welded to the welding pieces of the frame.

10. The push switch as claimed in claim 1, wherein each of the pair of engagement extending portions further includes a pair of inclined portions formed at a lower end portion of the lock portion so as to extend in a lower and outer direction and being spaced apart from each other.

11. The push switch as claimed in claim 1, wherein each of the pair of cover lock portions has a guide slope whose height gradually increases from the upper side toward the lower side, and a flat portion flatly extending from a top of the guide slope toward the lower side.

12. A push switch, comprising:

a case including a containing portion defined by a bottom plate and a plurality of wall portions extending from the bottom plate toward an upper side, and a sealing groove formed on upper end surfaces of the plurality of wall portions;

a pair of contacts provided on the bottom plate of the containing portion so as to be spaced apart from each other;

a movable contact which is disposed above the pair of contacts in the containing portion and can be displaced between a first position in which the pair of contacts are in a non-conductive state and a second position in which the pair of contacts are in a conductive state;

a cap for covering the containing portion of the case from the upper side, the cap including a base portion disposed on the upper end surfaces of the plurality of wall portions of the case, a protruding portion protruding from the base portion toward the upper side, and a sealing protrusion protruding from a peripheral edge portion of the base portion toward a lower side for liquid-tightly sealing the sealing groove of the case; and a cover attached to the case from the upper side so as to hold the cap on the case, the cover including a top plate and an opening which is formed in the top plate and through which the protruding portion of the cap passes, wherein the sealing protrusion of the cap is compressively deformed in the sealing groove of the case in a state that the cap is held on the case by the cover, and thereby the sealing groove of the case is liquid-tightly sealed, wherein the cap further includes a pair of outwardly extending portions respectively extending from a pair of opposite sides of the base portion toward an outside, wherein the case further includes a pair of cutouts formed on the upper end surfaces of the plurality of wall portions, and wherein the pair of outwardly extending portions of the cap are respectively engaged with the pair of cutouts of the case.

13. A push switch, comprising:

a case including a containing portion defined by a bottom plate and a plurality of wall portions extending from the bottom plate toward an upper side, and a sealing groove formed on upper end surfaces of the plurality of wall portions;

a pair of contacts provided on the bottom plate of the containing portion so as to be spaced apart from each other;

a movable contact which is disposed above the pair of contacts in the containing portion and can be displaced between a first position in which the pair of contacts are in a non-conductive state and a second position in which the pair of contacts are in a conductive state;

a cap for covering the containing portion of the case from the upper side, the cap including a base portion disposed on the upper end surfaces of the plurality of wall portions of the case, a protruding portion protruding from the base portion toward the upper side, and a sealing protrusion protruding from a peripheral edge portion of the base portion toward a lower side for liquid-tightly sealing the sealing groove of the case;

a cover attached to the case from the upper side so as to hold the cap on the case, the cover including a top plate and an opening which is formed in the top plate and through which the protruding portion of the cap passes; and a frame attached to the case from the lower side, wherein the sealing protrusion of the cap is compressively deformed in the sealing groove of the case in a state that the cap is held on the case by the cover, and thereby the sealing groove of the case is liquid-tightly sealed, wherein the frame includes a bottom plate, wherein the case is held between the cover and the frame, wherein the top plate of the cover has a substantially square planar shape, wherein the cover further includes a pair of welding pieces extending from each of another pair of opposite sides of the top plate toward the lower side, wherein the bottom plate of the frame has a substantially square planar shape, wherein the frame further includes a pair of welding pieces extending from each of opposite sides of the bottom plate toward the upper side, and wherein the pair of welding pieces of the cover are respectively welded to the pair of welding pieces of the frame, and thereby the case is held between the cover and the frame welded to each other.

* * * * *